(12) United States Patent
Lagally et al.

(10) Patent No.: US 9,435,633 B2
(45) Date of Patent: Sep. 6, 2016

(54) QUASI-VIRTUAL LOCATE/DRILL/SHIM PROCESS

(71) Applicant: The Boeing Company, Chicago, IL (US)

(72) Inventors: Christie Dusty Lagally, Seattle, WA (US); Alan Ray Merkley, Greenbank, WA (US); Ronald J. Collins, Brier, WA (US); Stephan J. Favilla, Monroe, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/735,232

(22) Filed: Jun. 10, 2015

(65) Prior Publication Data

US 2015/0276376 A1    Oct. 1, 2015

Related U.S. Application Data

(63) Continuation of application No. 14/083,876, filed on Nov. 19, 2013, now Pat. No. 9,068,809.

(51) Int. Cl.
*G01B 11/14* (2006.01)
*G01B 11/00* (2006.01)

(52) U.S. Cl.
CPC .............. *G01B 11/00* (2013.01); *G01B 11/14* (2013.01)

(58) Field of Classification Search
CPC combination set(s) only.
See application file for complete search history.

(56) References Cited

U.S. PATENT DOCUMENTS

| | | |
|---|---|---|
| 5,318,394 A | 6/1994 | Pierce et al. |
| 5,353,884 A | 10/1994 | Misawa et al. |
| 5,560,102 A | 10/1996 | Micale et al. |
| 5,875,859 A | 3/1999 | Ikeda et al. |
| 6,550,129 B1 | 4/2003 | Buttrick, Jr. |
| 6,618,505 B2 | 9/2003 | Cork et al. |
| 6,808,143 B2 | 10/2004 | Munk et al. |
| 6,922,599 B2 | 7/2005 | Richey |
| 7,083,143 B2 | 8/2006 | Whitmer et al. |
| 7,195,429 B2 | 3/2007 | Dods et al. |
| 7,214,008 B1 | 5/2007 | Dods et al. |
| 7,614,159 B2 | 11/2009 | Kilwin et al. |
| 7,813,830 B2 | 10/2010 | Summers et al. |
| 7,827,012 B2 | 11/2010 | Whitmer |
| 7,974,722 B2 | 7/2011 | Boyl-Davis et al. |
| 8,043,033 B2 | 10/2011 | Clark |
| 8,181,467 B2 | 5/2012 | Kumar et al. |
| 8,342,444 B2 | 1/2013 | Hartshorn et al. |
| 2004/0191017 A1 | 9/2004 | Erickson et al. |
| 2008/0289207 A1 | 11/2008 | Schmier et al. |
| 2009/0269153 A1 | 10/2009 | Schevers et al. |
| 2012/0316666 A1 | 12/2012 | Boyl-Davis et al. |

*Primary Examiner* — Tri T Ton
(74) *Attorney, Agent, or Firm* — Ostrager Chong Flaherty & Broitman P.C.

(57) ABSTRACT

A method for determining characteristics of a shim fittable between first and second bodies, comprising: (a) placing optical targets in respective sets of holes in the first and second bodies; (b) scanning respective surfaces of the first and second bodies using a three-dimensional scanner to acquire point cloud scan data, measured hole vector data and other discrete feature data; (c) processing the point cloud scan data, measured hole vector data and other discrete feature data to derive first deviation values representing the deviation of the surface of the first body from a nominal surface of the first body and second deviation values representing the deviation of the surface of the second body from a nominal surface of the second body; (d) correlating the first deviation values with the second deviation values based on a best fit position of the first body relative to the second body; and (e) computing shim gap values based on the correlated first and second deviation values.

20 Claims, 32 Drawing Sheets

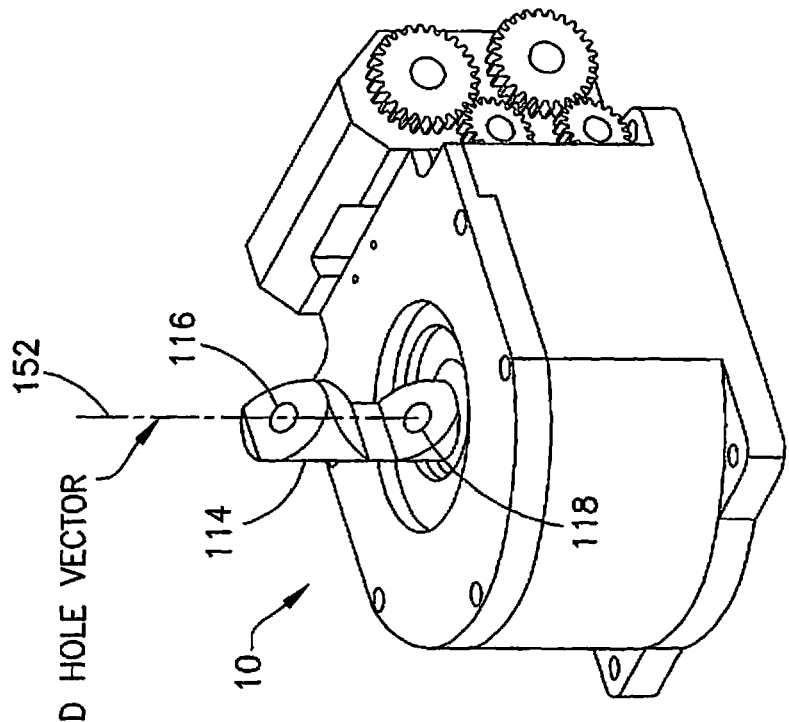
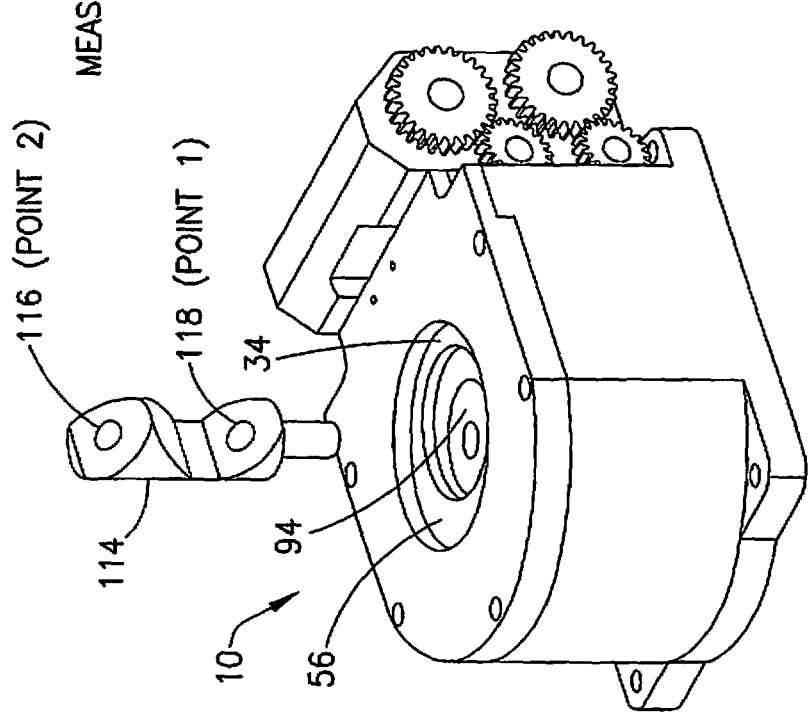

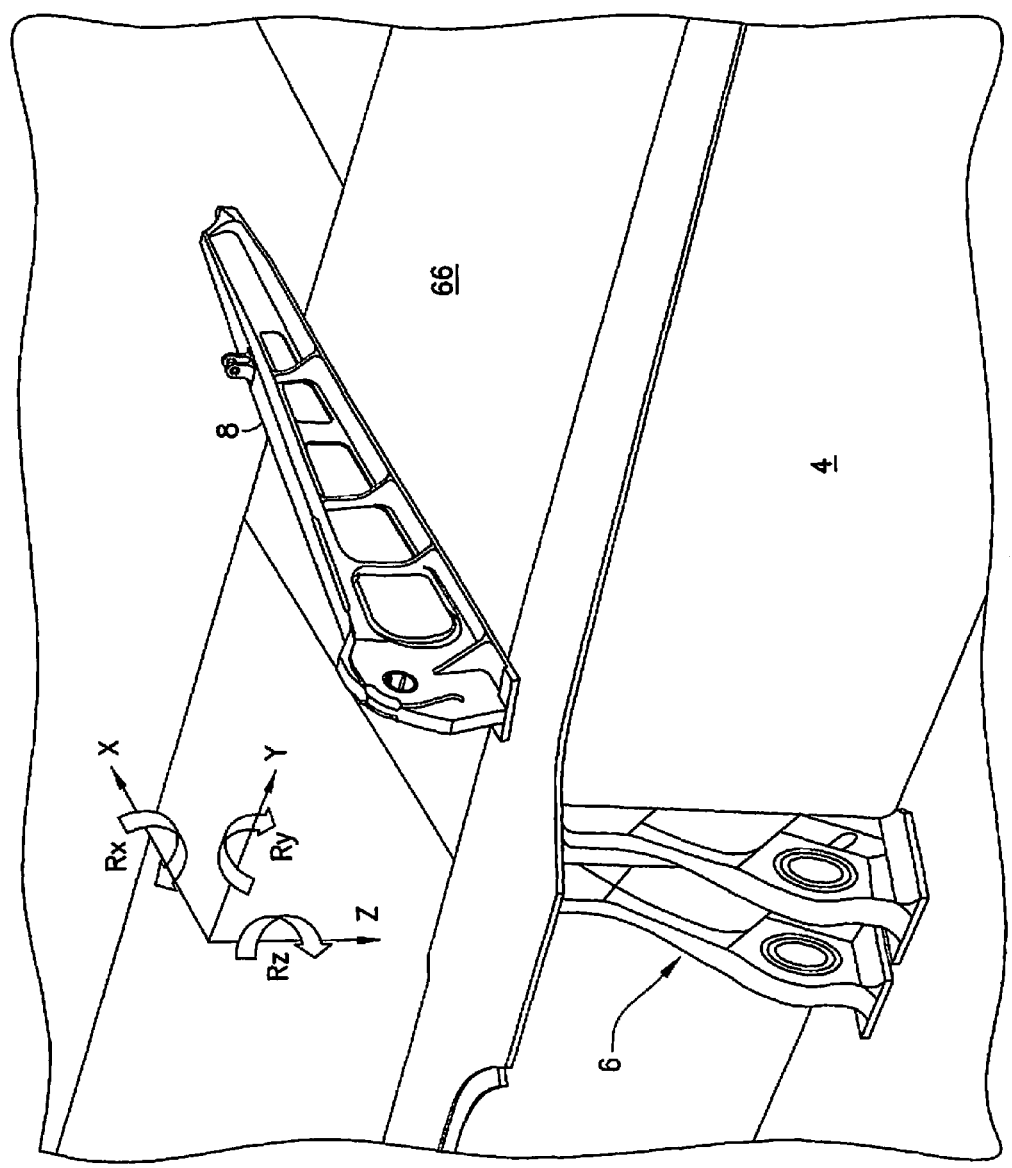

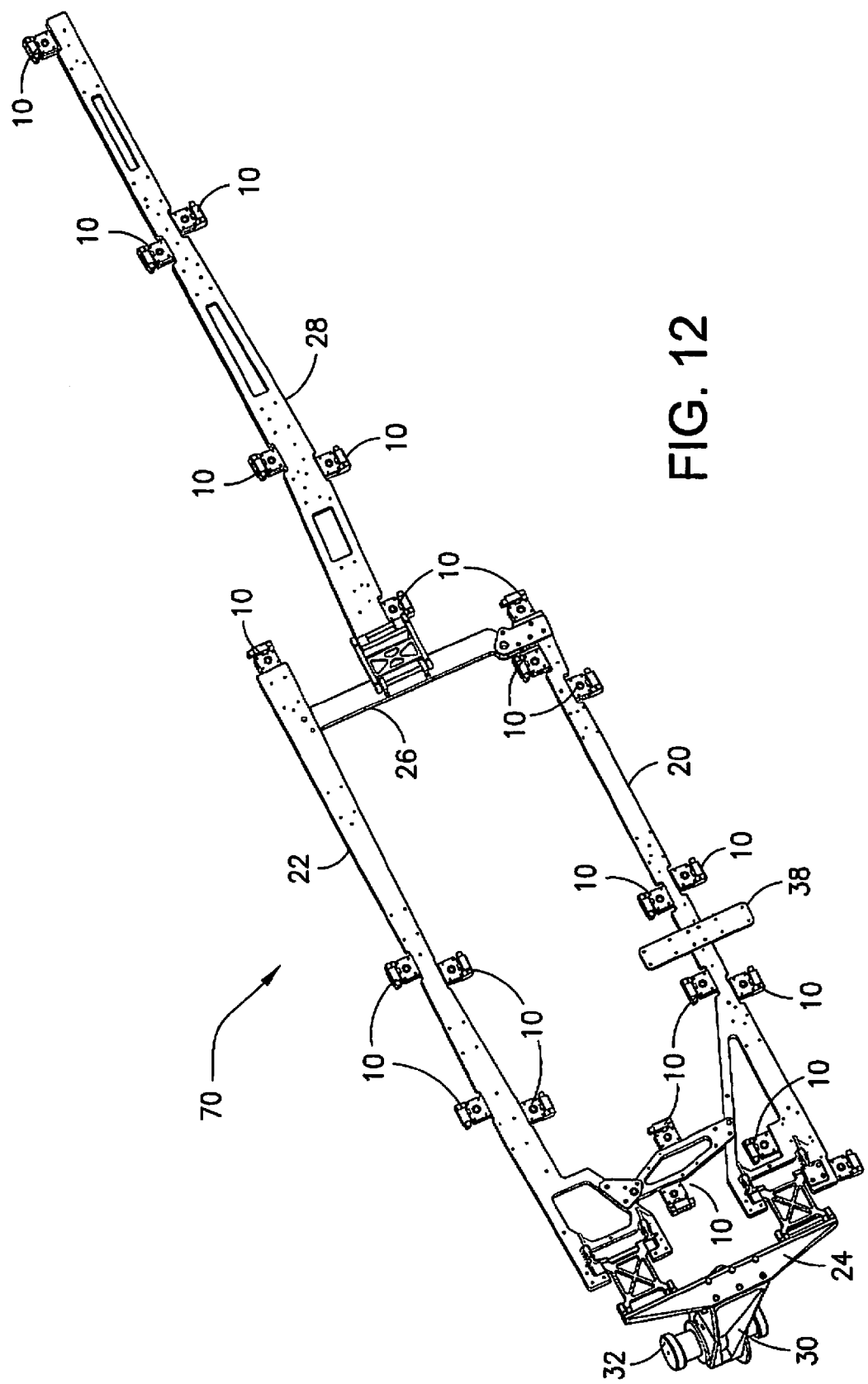

QUASI-VIRTUAL LOCATE/DRILL/SHIM PROCESS

RELATED PATENT APPLICATIONS

This application is a continuation of and claims the benefit of priority from U.S. patent application Ser. No. 14/083,876 filed on Nov. 19, 2013, which application in turn is a continuation-in-part of and claims the benefit of priority from U.S. patent application Ser. No. 14/016,709 filed on Sep. 3, 2013 (the disclosure of which is incorporated by reference herein in its entirety), which application in turn claims the benefit of priority from U.S. Provisional Application No. 61/832,084 filed on Jun. 6, 2013. U.S. patent application Ser. No. 14/083,876 also claims the benefit of priority from U.S. Provisional Application No. 61/832,126 filed on Jun. 6, 2013.

BACKGROUND

The present disclosure relates generally to locating and shimming one part relative to another part, such as parts constructed and assembled for aircraft or ships.

Determinate assembly (DA) is a method of aligning parts using mating physical features. Typically, coordinating holes which are placed on each part or structure are used to take advantage of the ability to install temporary fasteners to hold the parts together. Determinate assembly holes are typically installed on a part or structure during production or via a computer numerical control (CNC) mill onto a part that is properly indexed in a jig so hole installation is accurate. There are three major challenges to drilling and using DA holes, particularly in large, built-up structures such as wings. First, DA holes are accompanied by inherent reference or indexing tolerance. Tolerance build-up, especially in large parts or in assemblies, can cause DA to be ineffective, particularly when used in large assembly indexing. Second, DA hole placement on parts may not be feasible for built-up structures or for parts that cannot be indexed properly or easily in a CNC mill (i.e., a wing, wing panel, or fuselage section). For large assemblies where parts are placed relative to one another, DA holes cannot be placed ahead of time because the correct location is not yet known. Lastly, large surfaces (such as a fuselage, wing panel, etc.) can flex during installation or the surface definition may vary considerably and deviate from engineering nominal. Any drill jig applied to the surface without consideration of the as-built surface variation, results in holes with the additional error from jig placement on the as-built surface.

Currently, assembly of parts on large structures is achieved via monument locating jigs that hold parts in place while they are attached. These jigs are expensive to build and must be maintained at considerable cost. Typically, they are the largest non-recurring costs in new airplane development. Large, monument jigs also present a financial bottleneck for future rate increases or incorporation of new airplane derivatives. For the placement of strut fittings, additional errors in placement occur when the jig is adjusted to try to minimize shim thickness over three fittings installed in a monument drill jig. Existing, manually adjustable drill jigs have been tried before. Their primary drawback is that they require a metrology system that provides real-time positioning feedback, limiting the types of metrology systems that can be used. A second drawback is that these solutions do not take into account the effect of surface variation on hole location, thus inducing error in their hole positioning. Also, they are inefficient in positioning for many hole locations since each must be adjusted by hand. Finally, errors associated with the locate/drill jig are repeatedly transferred to every airplane.

In addition, the parts of an assembly are sometimes required to be joined together with an accuracy that is within a specified tolerance. For example, in the aerospace industry, some parts may be required to be assembled together with less than a 0.005 inch gap between them. When the gap exceeds the specified tolerance, a shim or similar filler may be inserted into the gap in order to assure a within-tolerance fit between the parts. Shims can be used to fill voids discovered during an assembly process. Voids are typically formed by the misalignment of parts during assembly or by the incorrect manufacture of the parts being assembled. Although mostly used on an informal basis during manufacturing, some shims are called out on drawings as part of the manufacturing process. Filling voids between mating surfaces on assembled parts results in a more structurally sound assembly. Shims are used throughout the aerospace industry to compensate for part variation due to the complex aerodynamic shapes of various assembled parts.

One method of filling the gaps between mating parts, sometimes referred to as predictive shimming, involves scanning the interfacing part surfaces in an attempt to predict the exact shape of the gap or void between these surfaces. The parts of the assembly are virtually fitted together and a shim is fabricated based on the virtually predicted relationship between the parts. In accordance with one method, digitally defined shims are created for joining interfaces at each part surface to join parts of an arbitrarily configured assembly. The method takes two or more digital surfaces that define independent joining surfaces and after establishing a relationship between them, a resultant virtual solid mass is created that exactly fills the void between the mating surfaces. One advantage of the disclosed method is the ability to determine part-to-part relationships of an arbitrary "as built" part configuration at the time of assembly, rather than predict relationships in advance.

There is room for improvements in methods and apparatus for locating and shimming one part relative to another part when the parts are to be aligned using mating physical features such as drilled coordination holes.

SUMMARY

The quasi-virtual locate/drill/shim process disclosed herein is a metrology-directed, DA hole placement method coupled with predictive shimming methods using a suite of metrology and three-dimensional (3-D) CAD tools. In accordance with one implementation, this method can be used to locate and shim strut fittings on a wing of an aircraft. This method would be applicable for accurately locating many other types of fittings and components on an aircraft or ship. The process uses adjustable drill bushings as part of a simple fixture, which drill bushings are driven into the correct position using 3-D measurement data while maintaining engineering positional requirements with respect to features. The data calculations and bushing movements are all automated. The location of each drill bushing is solved by measuring the location of several critical wing features (e.g., the pitch load fitting or skin surface). Once positioned correctly, the DA holes are hand drilled. Predictive shimming is achieved by virtually fitting the strut features to the wing features per engineering requirements. The wing features include the hand-drilled DA holes. The corresponding shim gaps are then used to develop surfaces and subsequent shimming models.

One aspect of the subject matter disclosed herein is a method for determining characteristics of a shim fittable between first and second bodies. The method comprises: (a) placing optical targets in holes in the first body; (b) scanning a surface of the first body using a three-dimensional scanner to acquire point cloud scan data, measured hole vector data and other discrete feature data for the first body; (c) processing the point cloud scan data, measured hole vector data and other discrete feature data for the first body to derive first deviation values representing the deviation of the surface of the first body from a nominal surface of the first body for a first grid of points; (d) placing optical targets in holes in the second body; (e) scanning the surface of the second body using a three-dimensional scanner to acquire point cloud scan data, measured hole vector data and discrete feature data for the second body; (f) processing the point cloud scan data, measured hole vector data and other discrete feature data for the second body to derive second deviation values representing the deviation of the surface of the second body from a nominal surface of the second body for a second grid of points that matches the first grid of points; (g) correlating the first deviation values with the second deviation values based on a best fit position of the first body relative to the second body; (h) computing shim gap values based on the correlated first and second deviation values; and (i) using the shim gap values to develop a shim model. A shim may be fabricated in accordance with the shim model.

In the above-described method, process (c) may comprise: deriving hole/surface intersect points for the first body using point cloud scan data surrounding hole locations indicated by the measures hole vector data for the first body; fitting the scanned surface of the first body to a nominal surface of the first body using the derived hole/surface intersect points; extrapolating the point cloud scan data for the first body to points of the first grid of points; and computing the first deviation values. Process (f) may comprise a similar process for the second body.

In the above-described method, process (g) may comprise: establishing relationships between first body data and second body data; and optimizing a virtual fit between the first and second bodies.

Another aspect of the subject matter disclosed herein is a system for determining characteristics of a shim fittable between first and second bodies. The system comprises a computer system programmed to execute the following operations: (a) processing point cloud scan data, measured hole vector data and other discrete feature data for a first body to derive first deviation values representing the deviation of the surface of the first body from a nominal surface of the first body for a first grid of points; (b) processing point cloud scan data, measured hole vector data and other discrete feature data for a second body to derive second deviation values representing the deviation of the surface of the second body from a nominal surface of the second body for a second grid of points that matches the first grid of points; (c) correlating the first deviation values with the second deviation values based on a best fit position of the first body relative to the second body; (d) computing shim gap values for the grid of points based on the correlated first and second deviation values; and (e) using the shim gap values to develop a shim model.

A further aspect of the disclosed subject matter is a method for determining characteristics of a shim that conforms to respective surfaces of first and second bodies, comprising: attaching a drill jig having a plurality of drill bushings to the first body; locating the drill bushings in accordance with the measurements of the wing features; drilling holes in the first body at the locations of the drill bushings; removing the drill jig from the first body; placing optical targets in the drilled holes in the first body; scanning the surface of the first body using a three-dimensional scanner to acquire point cloud scan data, measured hole vector data and other discrete feature data for the first body; placing optical targets in the holes in the second body; scanning the surface of the second body using a three-dimensional scanner to acquire point cloud scan data, measured hole vector data and other discrete feature data for the second body; processing the point cloud scan data, measured hole vector data and other discrete feature data for the first and second bodies to derive shim gap values; and using the shim gap values to develop a shim model. The method may further comprise: making a shim in accordance with the shim model; and placing the shim between the first and second bodies.

The quasi-virtual locate/drill/shim process disclosed herein has the following advantageous features: (1) The process installs DA holes in as-built surfaces or assemblies based on engineering nominal information using a metrology-directed bushing positioning device housed on a simple fixture. Each drill bushing is individually placed according to local metrology data. (2) The process uses metrology data, rather than large drill jigs, to virtually place parts (such as strut fittings) by creating shims that assist in the accurate placement of the part. (3) The process allows independent placement of strut fittings, rather than placing the fittings as a group and trying to minimize errors over a long span. This process allows errors to be easily minimized locally rather than attempting to minimize error over a large area. (4) The process supports derivative airplane development without the need for modification of monument tooling. (5) The process allows flexibility of the manufacturing process rather than constraining the work to occur in one tooling position only. (6) The process provides the ability to accurately replace strut fittings in the field (airplane on the ground) without the need for large locating fixtures. (7) The process is not beholden to one specific measurement system. Several different metrology tools can be incorporated into the process.

Other aspects are disclosed in detail and claimed below.

BRIEF DESCRIPTION OF THE DRAWINGS

FIGS. 7A and 7B are schematic views showing a vector target disposed above (FIG. 7A) and installed inside (FIG. 7B) the double eccentric positioning apparatus depicted in FIG. 1. The dashed line through the vector target in FIG. 7B represents a measured hole vector.

FIG. 11 is a diagram showing a schematic view of a front portion of a wingbox having inboard and outboard pitch load fitting and a strut fitting attached thereto.

FIGS. 12 and 13 are respective schematic views (from above and below) of the drill jig seen in FIG. 8.

Reference will hereinafter be made to the drawings in which similar elements in different drawings bear the same reference numerals.

DETAILED DESCRIPTION

A locate/drill/shim process will now be described with reference to certain embodiments. In accordance with one implementation, this process may be used to locate and shim strut fittings on a wing of an aircraft. While a primary use of the embodiments disclosed herein is in the field of aircraft construction and assembly, the teachings herein have application in other types of construction and assembly, including, for example, shipbuilding, automobile manufacture, building construction and the like.

The drilling of DA holes is facilitated by an apparatus which locates drill bushings in the correct position for drilling holes in the respective parts being assembled. This locating function is performed by an automated apparatus that comprises adjustable drill bushings. These drill bushings are driven into correct position using 3-D measurement data. After the drill bushings are positioned correctly, the DA holes are hand drilled. Predictive shimming is used to virtually fit features of each strut to the wing features per engineering requirements. The corresponding shim gaps are then used to develop surfaces and subsequent shimming models. Shims are then fabricated in accordance with the shimming models and installed between the parts during assembly.

The methodology and apparatus for properly locating the drill bushings with respective to the parts being assembled will be described with reference to FIGS. 1-10 and 12-14. Thereafter, the methodology and apparatus for properly shimming the parts will be described with reference to FIGS. 11 and 15-26.

Figure 1:
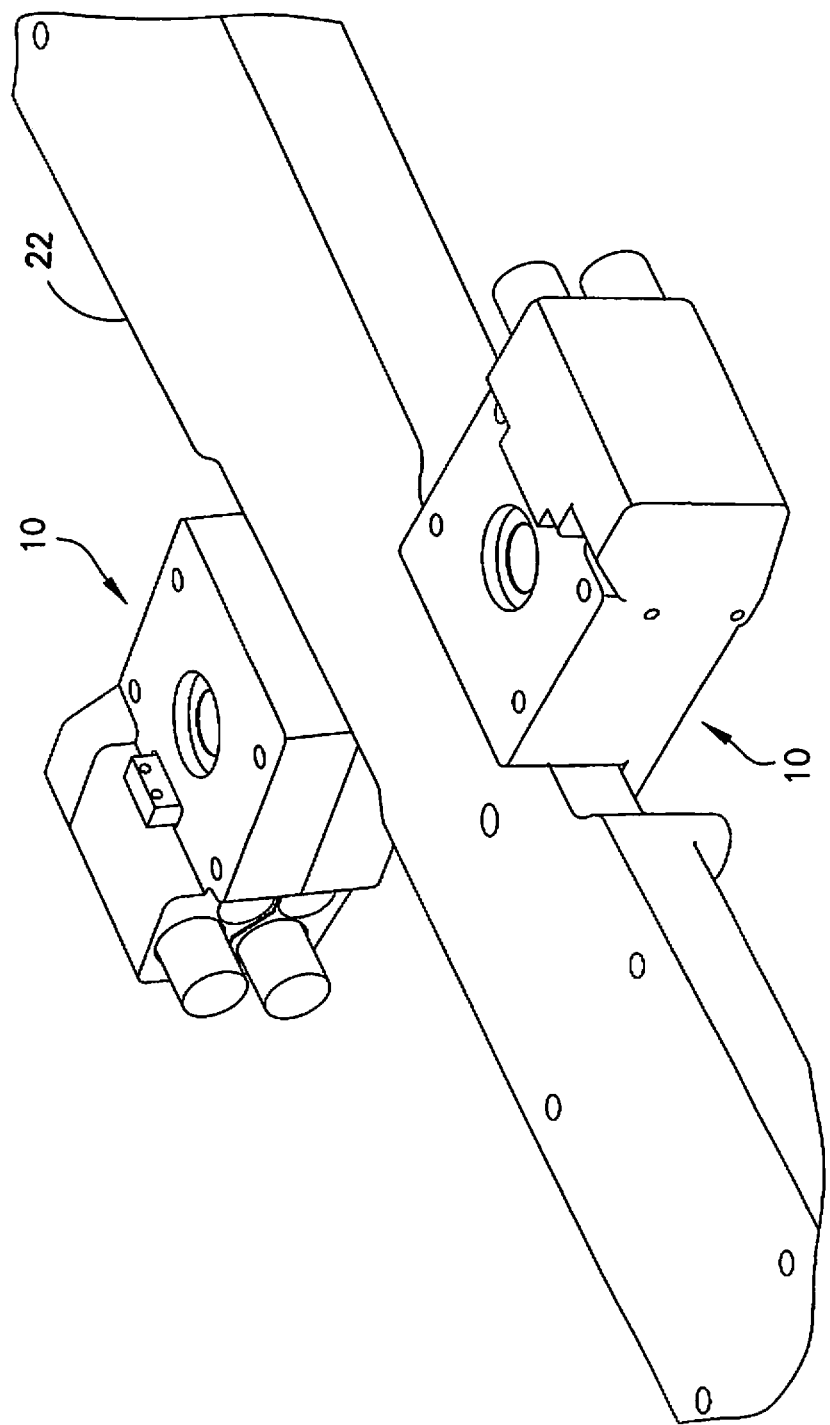
FIG. 1 is a diagram showing a schematic view of a pair of double eccentric positioning apparatus installed on a lightweight drill jig (only a portion of which is shown) in accordance with one embodiment.
Figure 8:
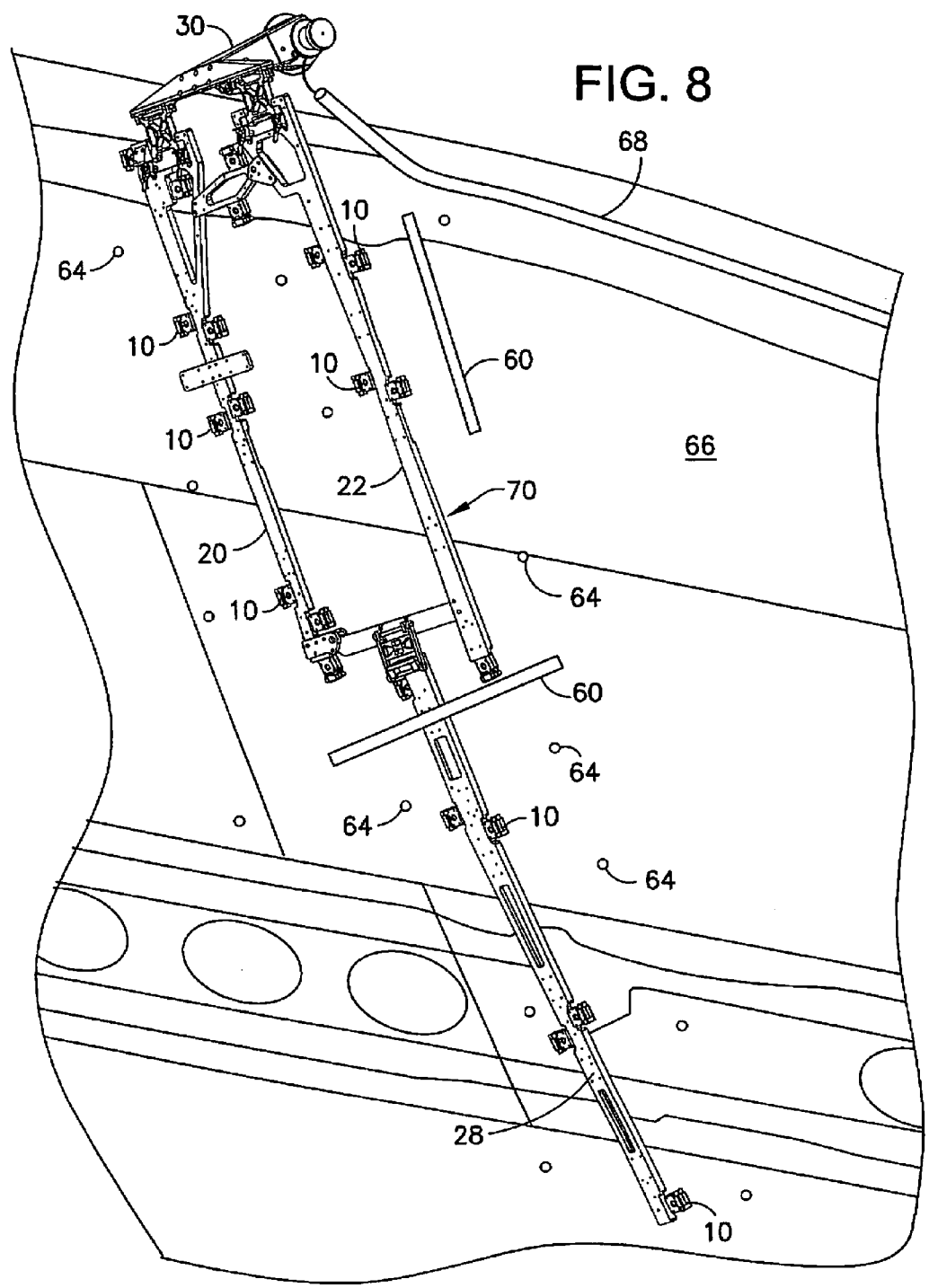
FIG. 8 is a diagram showing a schematic view of a multiplicity of adjustable bushing drill jigs installed on a lightweight drill jig for rough placement on a wingbox in accordance with one embodiment.

FIG. 1 shows a pair of double eccentric positioning apparatus 10 bolted to a backbone 22 of a drill jig (item 70 in FIG. 8). As will be explained in more detail later, the drill jig 70 is configured such that when it is clamped to the part to be drilled, it provides a rough placement of the axis of each double eccentric positioning apparatus 10 (see, e.g., measured hole vector 152 in FIG. 10A) near a nominal hole vector (see, e.g., nominal hole vector 150 in FIG. 10A). Fine positioning is achieved by means of the double eccentric positioning apparatus 10, which can be controlled to move its own axis (i.e., the axis of an inner eccentric bushing which receives a drill bushing) to intersect the part at a nominal intersect point corresponding to the DA hole to be drilled.

The double eccentric positioning apparatus 10 comprises an inner eccentric bushing and an outer eccentric bushing, as disclosed in detail in U.S. patent application Ser. No. 14/016,709. The inner eccentric bushing is located concentric to the offset of the outer eccentric bushing. The two eccentric bushings have equal offsets to accurately position a tool (such as a drill bushing) in two dimensions. This allows any position, within a radius of two times the offset, to be achieved.

Figure 2:
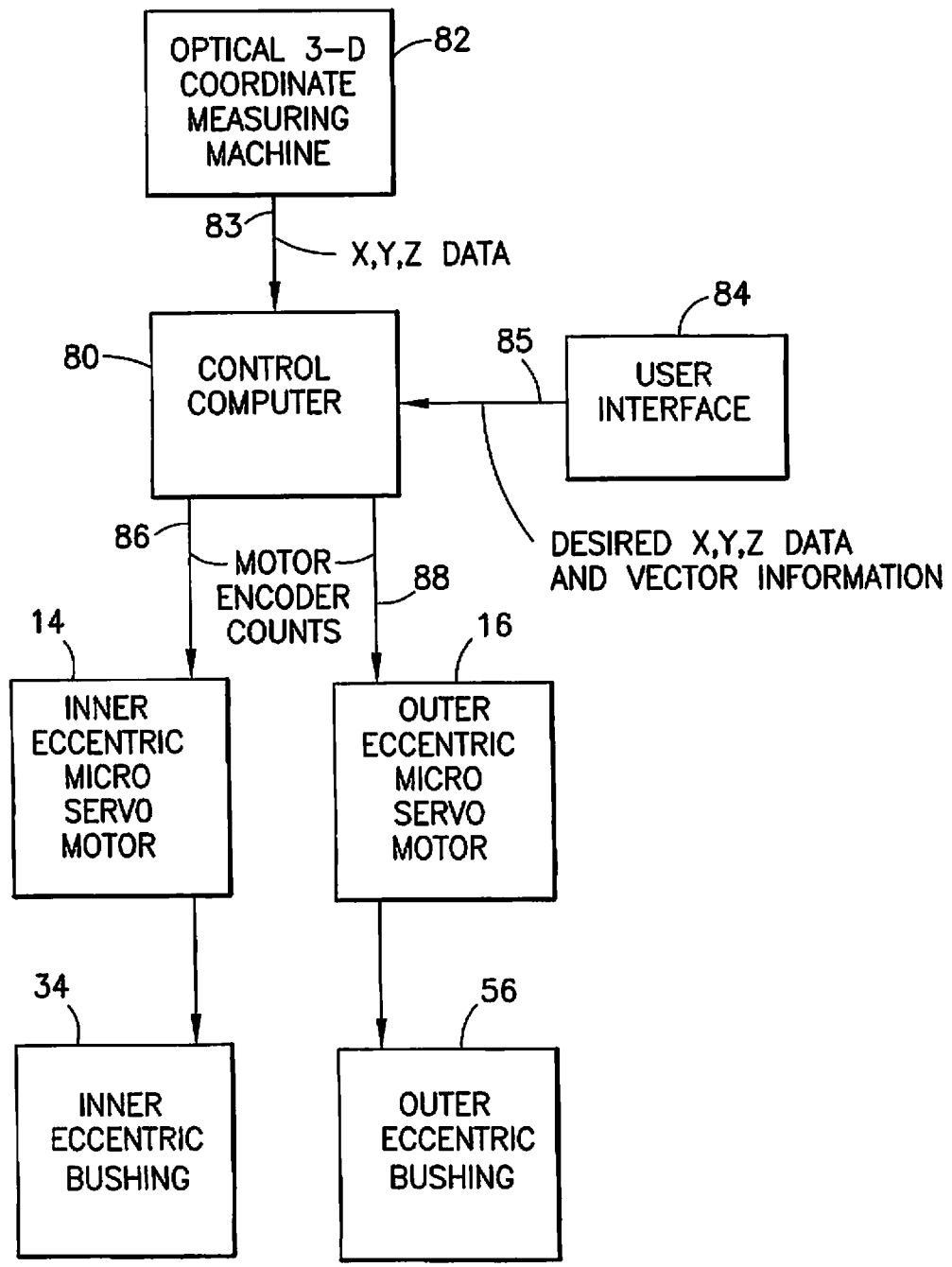
FIG. 2 is a block diagram showing the architecture of a system for controlling the offset vectors of a double eccentric positioning apparatus based on surface data collected by a metrology system.

FIG. 2 is a block diagram showing the architecture of a system for controlling the offset vectors of the double eccentric positioning apparatus 10 based on optical measurement of three-dimensional (3-D) coordinates by a portable metrology system (e.g., optical 3-D coordinate measuring machine 82). In accordance with one implementation, a photogrammetric tool (e.g., a TRITOP$^{CMM}$ system commercially available from Gesellschaft für Optische Messtechnik) is employed. A control computer 80 outputs respective encoder counts 86 and 88 to respective micro servo motors 14 and 16 for moving inner and outer eccentric bushings 34 and 56 of the double eccentric positioning apparatus 10 to respective desired positions in accordance with a position control algorithm. In accordance with one embodiment, the motor encoder counts are a function of measured x,y,z data 83 from an optical 3-D coordinate measuring machine 82 and desired x,y,z data and vector information 85 input by a system operator via a user interface 84.

The control computer 80 executes a position control algorithm that achieves fine positioning of the axis of the inner eccentric bushing 34 by operation of the micro servo motors 14 and 16. The goal is to move the axis of the inner eccentric bushing axis 152 relative to the workpiece, so that the axis will intersect the workpiece at or near a nominal intersect point of an axis of the desired hole to be drilled with the nominal wing surface (to be described in detail later with reference to FIGS. 10A-10F). The control computer 80 will take in current x,y,z data 83, as provided by the optical 3-D coordinate measuring machine 82. Desired x,y,z data and vector information 85 can either be stored in the program, or can be fed to the control computer 80 via the user interface 84. Transformations will allow the control computer 80 to calculate x and y deviations based on each individual drill bushing (see drill bushing 94 in FIG. 10A). The x and y coordinates are converted to cylindrical coordinates (neglecting r and Z) to drive the micro servo motors 14 and 16. The rotation of the outer eccentric bushing 56 causes a rotation of the inner eccentric bushing 34 due to the planetary action between internal and external spur gears (not shown), which drive the inner eccentric bushing 34. This movement is calculated and corrected by simultaneously moving the inner eccentric bearing 34 to compensate for the coupled movement between the inner and outer eccentric bushings 34, 56.

Figure 3:
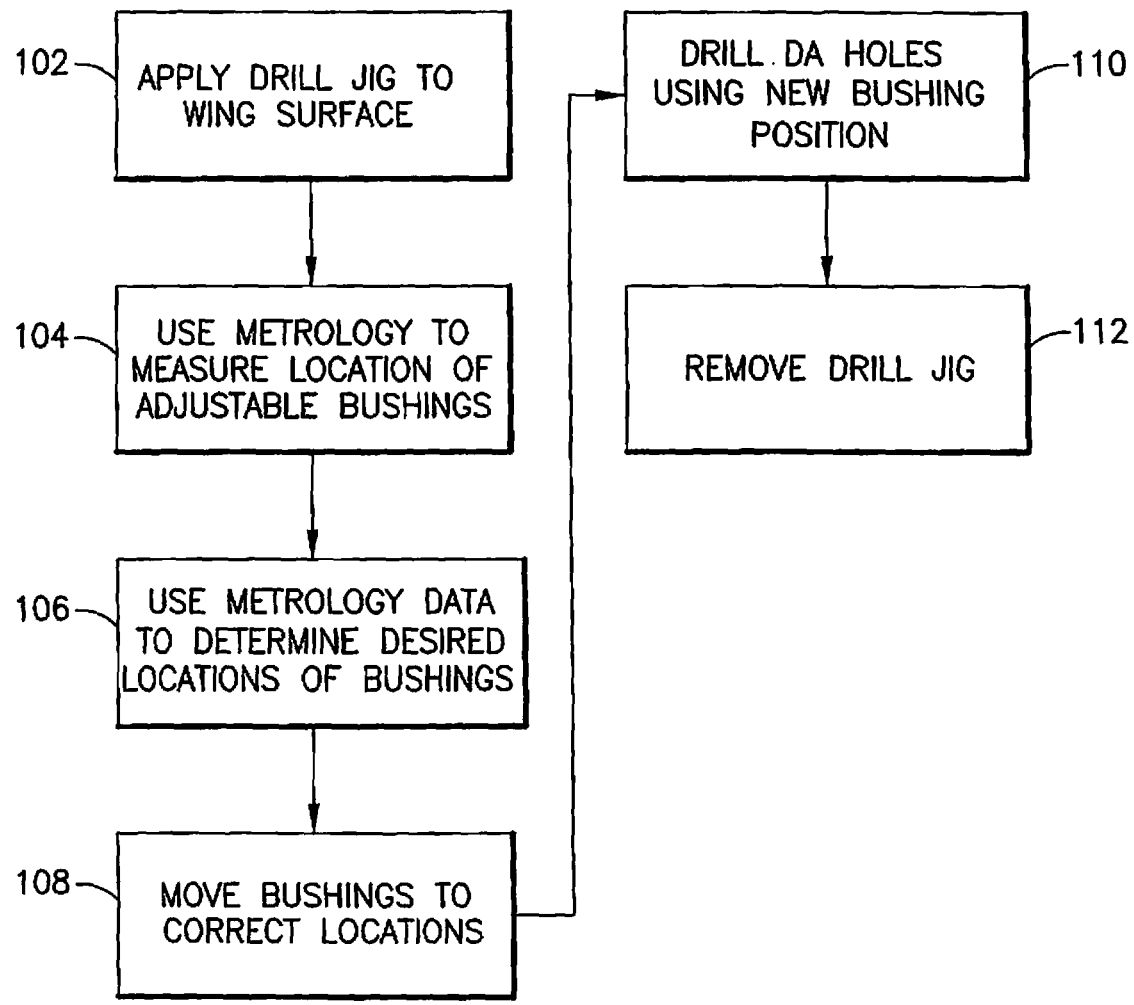
FIG. 3 is a flowchart showing steps of a metrology-directed, determinate assembly hole placement method.

Each of the micro servo motors 14, 16 has an internal encoder for measuring the angular position of the respective motor output shaft. The micro servo motors 14, 16, when activated, will rotate their respective outputs shafts until the outputs of the internal encoders indicate that the encoder counts received from the control computer (see control computer 80 in FIG. 2) have been attained, meaning that the axis of the inner eccentric bushing has arrived at the commanded location FIG. 3 is a flowchart showing steps of a metrology-directed, DA hole placement method in accordance with one embodiment. A drill jig is applied to a wing surface (step 102), e.g., by clamping to the wingbox. Then a metrology system is used to measure the location of the axis of the inner eccentric bushing of each double eccentric positioning apparatus attached to the drill jig (step 104). (The measured axis of the inner eccentric bushing is referred to hereinafter as the "measured hole vector".) The metrology data and a CAD model of the workpiece, which model includes the desired (i.e., nominal) location for the axis of the inner eccentric bushing, are used to calculate the desired move to be executed by the double eccentric positioning apparatus (step 106). (The desired axis of the inner eccentric bushing is referred to hereinafter as the "nominal hole vector".) The inner and outer eccentric bushings are then rotated to achieve the calculated move and the correct location for each inner eccentric bushing, in which a respective coaxial drill bushing is inserted (step 108). The DA holes are then drilled while the drill bushings are in their new positions (step 110). Upon completion of the drilling operations, the drill jig is removed from the wing box (step 112).

The location of each drill bushing is solved by measuring the location of the critical wing features to determine the correct position of the DA holes relative to the wing structure. The DA holes are hand drilled.

Figure 4:
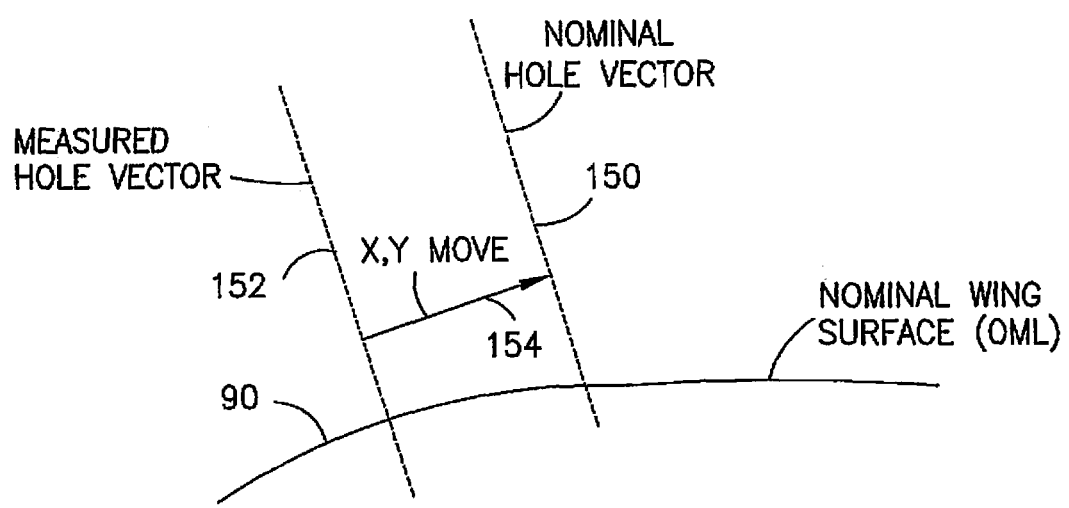
FIG. 4 is a diagram showing the relationship in space of measured and desired intersection vectors of a drill bushing initially used to calculate a move by the double eccentric positioning apparatus to a new position of the drill bushing when the intersection vectors are parallel.
Figure 5:
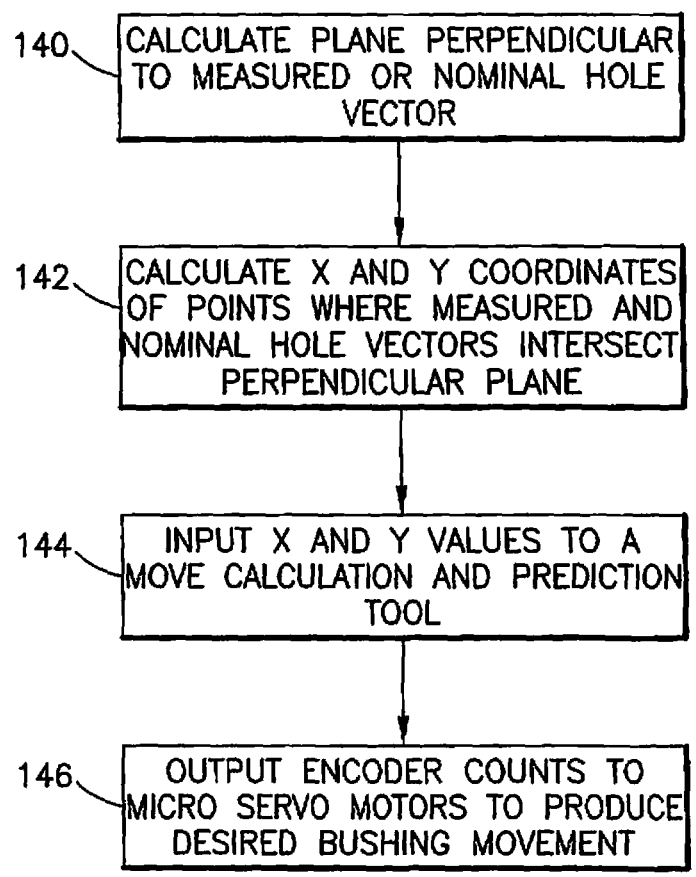
FIG. 5 is a flowchart showing a process for generating motor encoder counts that will produce a desired movement by an adjustable bushing.

FIG. 4 is a diagram showing parallel measured and nominal hole vectors 152 and 150 intersecting a nominal wing surface 90 (OML) having 3-D coordinates defined by a stored CAD model. In accordance with one method, these parallel vectors can be used to calculate a move 154 by the double eccentric positioning apparatus 10 that places the axis of the inner eccentric bushing 34 in the correct position, i.e., within a specified tolerance of the intersect point of the nominal hole vector 150 with the nominal wing surface 90. This process is shown in FIG. 5. First, a plane perpendicular to the known measured or nominal hole vector is calculated (step 140). Then the x and y coordinates of the points where the known measured and nominal hole vectors intersect the perpendicular plane are calculated (step 142). The x and y values for the desired move-to location are then input to a move calculator and prediction tool (step 144) running on control computer 80 (seen in FIG. 2), which will output correct encoder counts (steps 146) for each micro servo motor 14, 16 (seen in FIG. 2) of the double eccentric positioning apparatus 10 (see FIG. 1). These encoder counts produce the desired movement of the axis of the inner eccentric bushing 34 (by moving both inner eccentric bushing 34 and outer eccentric bushing 56) from a location coaxial with the measured hole vector 152 to a location coaxial with the nominal hole vector 150. This method could lead to a small error if the vectors are not parallel.

In accordance with an alternative method, non-parallel measured and nominal hole vectors 152 and 150 can be used to calculate a move by the double eccentric positioning apparatus 10 that places the axis of the inner eccentric bushing 34 in the correct position. A best fit for the intersection with the skin (or plate) can be determined as long as the direction of the measured hole vector 152 is known. The axis of the inner eccentric bushing 34 can be moved in a plane perpendicular to the measured hole vector 152 or in a plane perpendicular to the nominal hole vector 150. These methods will work for all cases (including when the measured and nominal hole vectors 152, 150 are parallel).

Figure 6:
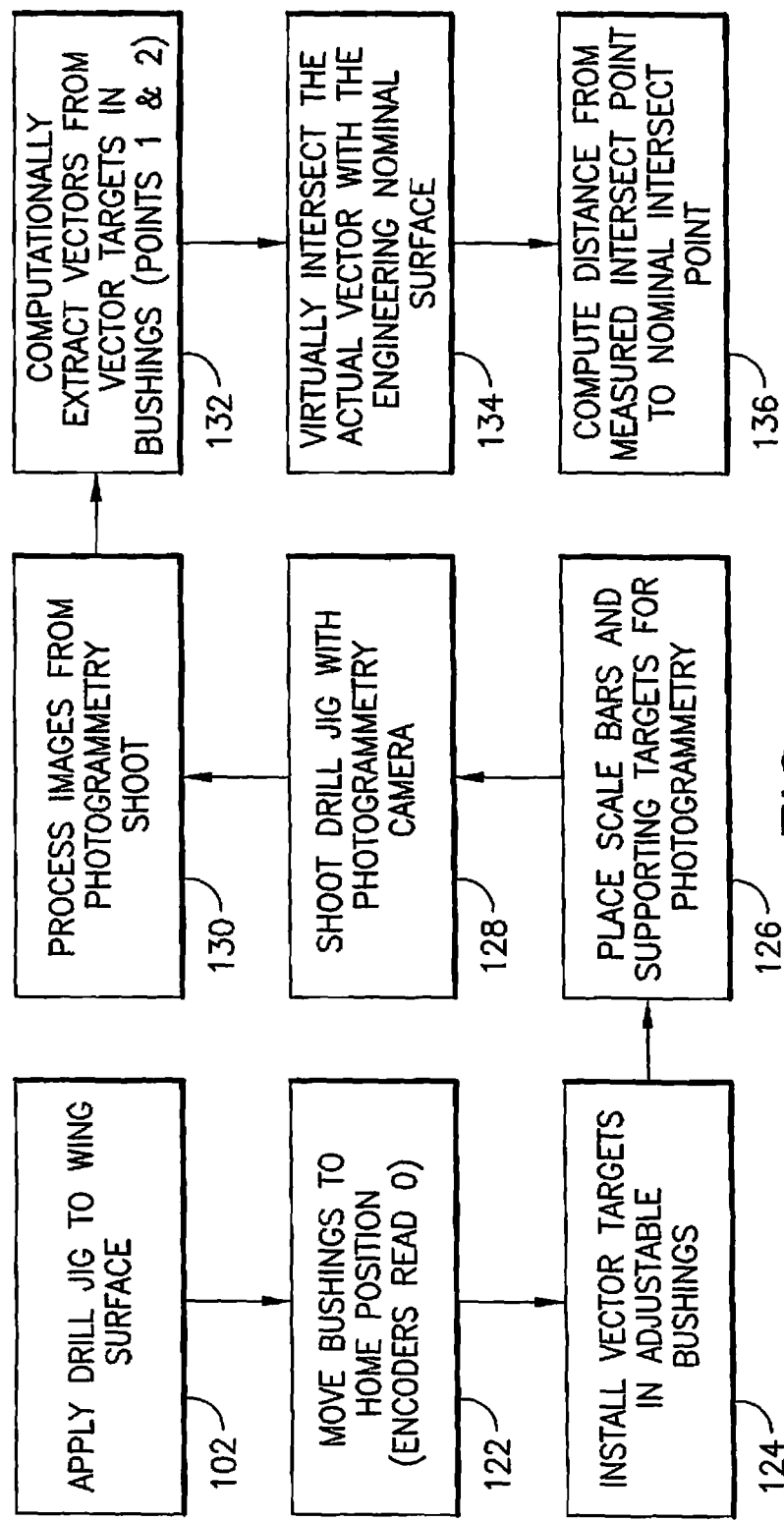
FIG. 6 is a flowchart showing steps of a method for determining the desired position of a center of the opening in the inner eccentric bushing of a double eccentric positioning apparatus in accordance with one embodiment.

FIG. 6 is a flowchart showing steps of a method for determining the desired position of a center axis (also referred to herein as the "nominal hole vector") of the opening in the inner eccentric bushing of a double eccentric positioning apparatus in accordance with one embodiment. As previously mentioned, a drill jig is applied to a wing surface (step 102), e.g., by clamping to the wingbox. A multiplicity of double eccentric positioning apparatuses 10 are attached to the drill jig (seen in FIG. 8, discussed below). The state of each double eccentric positioning apparatus 10 is controlled by the control computer 80 shown in FIG. 2. Referring again to FIG. 6, the inner and outer eccentric bushings 34, 56 of each double eccentric positioning apparatus 10 are moved to their respective home positions, whereat the encoders read 0 (step 122). A respective optical target (see vector target 114 in FIGS. 7A and 7B) is inserted in the opening of the inner eccentric bushing of each double eccentric positioning apparatus (step 124). Then scale bars and supporting optical targets (see scale bars 60 and optical targets 64 in FIG. 8) for photogrammetry are placed on the wing surface (step 126). Then the metrology system operator captures the location of the optical targets 64 using, for example, a photogrammetry camera (step 128). The images from the photogrammetry shoot are processed in a well-known manner (step 130). Vectors (i.e., measured hole vectors characterized by the locations of two points) are computationally extracted from photogrammetric data acquired from the vector targets (see vector targets 114 in FIG. 7B) in the bushings (step 132). In accordance with one embodiment, further computations are performed for each drill bushing which virtually intersect the measured hole vector with a nominal wing surface or with a plane that is perpendicular to a nominal hole vector and intersects the nominal intersect point (i.e., the intersect point of the nominal hole vector with the nominal wing surface) (step 134). Then a distance from the intersect point of the measured hole vector with the nominal wing surface (or the aforementioned plane) to the nominal intersect point is computed (step 136). These distances are then converted to move-to locations in bushing coordinates. A function receives the x and y coordinates of the move-to locations and uses that information to determine the encoder counts for moving the respective drill bushings to their respective move-to locations.

FIGS. 7A and 7B are schematic views showing a vector target 114 disposed above (FIG. 7A) and installed inside (FIG. 7B) the double eccentric positioning apparatus 10 depicted in FIG. 1. More specifically, as best seen in FIG. 7A, the stem of the vector target 114 will be inserted inside an opening of a drill bushing 94, which is in turn inserted inside the opening of the inner eccentric bushing 34. (The axes of the openings in drill bushing 94 and inner eccentric bushing 34 are coaxial.) The dashed line through the vector target 114 in FIG. 7B represents the measured hole vector 152, which intersects a pair of optical targets 116 and 118 incorporated in the vector target 114. As previously described, a photogrammetric camera is used to acquire images of vector targets inserted in all of the double eccentric positioning apparatuses 10 attached to the drill jig 70 seen in FIG. 8. An optical 3-D coordinate measuring machine (see optical 3-D coordinate measuring machine 82 in FIG. 2) determines the 3-D coordinates of respective points (hereinafter "Point 2" and "Point 1") corresponding to the locations of the optical targets 116 and 118 from the acquired image data. The line in virtual space which connects Points 1 and 2 corresponds to the measured hole vector 152 (see FIG. 4).

FIG. 8 is a diagram showing a schematic view of a multiplicity of double eccentric positioning apparatuses 10 installed on a lightweight drill jig 70 for rough placement on the wing skin 66 of an upside-down wingbox 2 in accordance with one embodiment. The drill jig 70 is attached to the wingbox 2 by means of a clamp 30 (which clamps to the pitch load fitting 6 shown in FIG. 11) and suction cups (not shown). The adjustable bushing drill jigs installed on drill jig 70 support respective double eccentric positioning apparatuses 10, one for each DA hole to be drilled. The motors of the double eccentric positioning apparatuses 10 receive the motor encoder counts from the control computer (see control computer 80 in FIG. 2) via an electrical cable 68. After (or before) the vector targets have been installed in the double eccentric positioning apparatuses 10, the scale bars 60 are placed on the wing skin 66, next to and across the drill jig 70, to set the photogrammetry scale.

Figures 9, 9A:
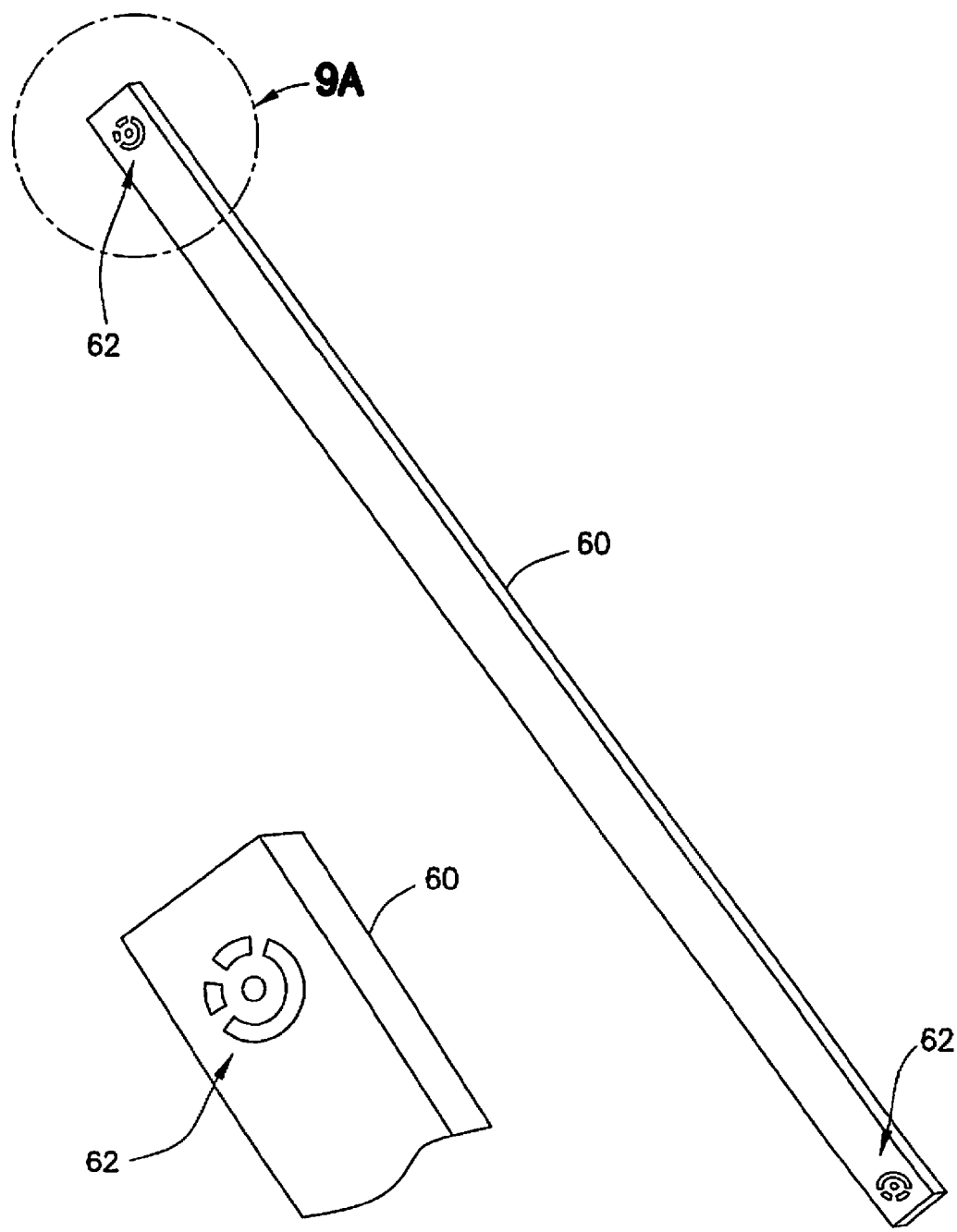
FIG. 9 is a diagram showing a schematic view of a scale bar marked with coded photogrammetry target in accordance with the embodiment depicted in FIG. 8.
FIG. 9A is a diagram showing a schematic view of the portion of the scale bar disposed within the dashed circle 9A shown in FIG. 9 which is a photogrammetry target.

FIG. 9 is a diagram showing a schematic view of a scale bar 60 marked with coded optical targets 62 (shown with a magnified scale in FIG. 9A) in accordance with one embodiment. In addition, adhesive photogrammetry scan targets 64 are placed on the wing skin 66 of the wingbox 2 around the drill jig 70 for image bundling. Step 122 and subsequent steps listed in the flowchart shown in FIG. 6 are performed while the drill jig 70 is clamped on the wingbox 2 in the manner shown in FIG. 8.

FIGS. 10A through 10F are graphical representations of calculations performed to find a new drill bushing location in accordance with one embodiment. In each graphical representation, the more smooth contour represents a nominal wing surface 90, while the less smooth contour represents an actual wing surface 92. The drill bushing 94 is depicted in FIGS. 10A-10E on a reduced scale to avoid clutter in the drawings, as is the vector target 114 in FIG. 10A.

In accordance with the embodiment shown in FIGS. 10A-10F, the distance and direction that the centerline axis of the drill bushing 94 (which is coaxial with the centerline axis of the inner eccentric bushing) is to be moved is determined based on the location of the nominal wing intersect point 162 (indicated by a large open circle in FIGS. 10A-10F) and the location of the point (hereinafter "actual vector/plane intersect point 166") where the measured hole vector 152 intersects a plane 164 that is normal to the nominal hole vector 150 and intersects the nominal wing intersect point 162. The procedure will now be described in detail.

Figure 10A:
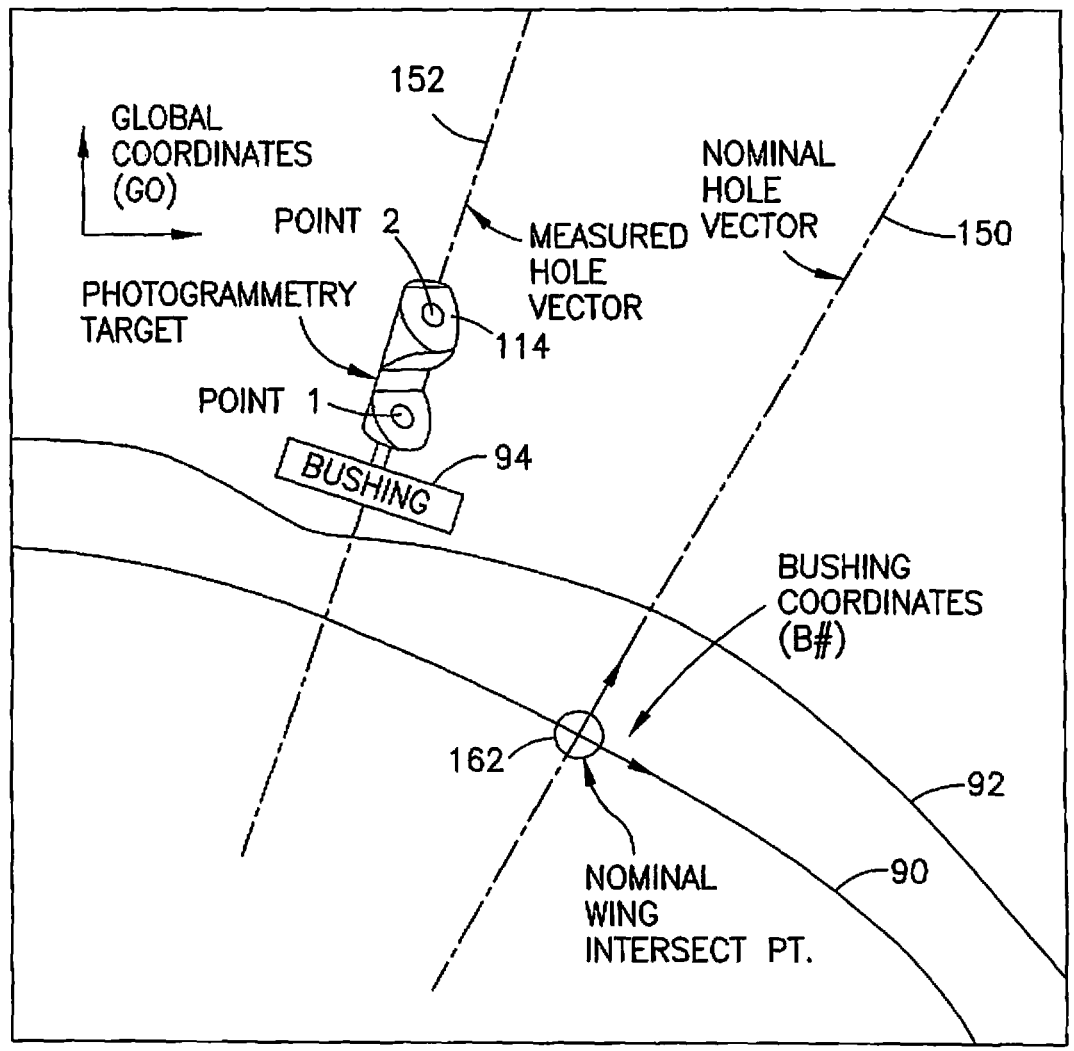
FIGS. 10A-10F are graphical representations of calculations performed to find a new drill bushing location in accordance with one embodiment. In each graphical representation, the more smooth contour represents a nominal wing surface 90, while the less smooth contour represents an actual wing surface 92.

FIG. 10A depicts a scenario wherein the location of the centerline axis of the opening in the drill bushing 94 is acquired in global (i.e., airplane) coordinates (G0) using a photogrammetry camera (not shown) and a vector target 114. The locations of Points 1 and 2 on the vector target 114 are measured in the global coordinate system. The measured locations of Points 1 and 2, which define the position and orientation of the measured hole vector 152, are transformed into X,Y,Z bushing coordinates, but only the X and Y coordinates are used to determine how much the drill bushing 94 should be moved.

FIG. 10A also shows a nominal wing intersect point 162 (indicated by a large open circle) where a nominal hole vector 150 intersects the nominal wing surface 90 in accordance with an engineering CAD model of a wingbox surface with a pattern of desired drillhole locations. The position of the nominal wing intersect point 162 is given in bushing coordinates (B#). For convenience, the origin of the bushing coordinate system is located at the nominal wing intersect point 162.

Figure 10B:
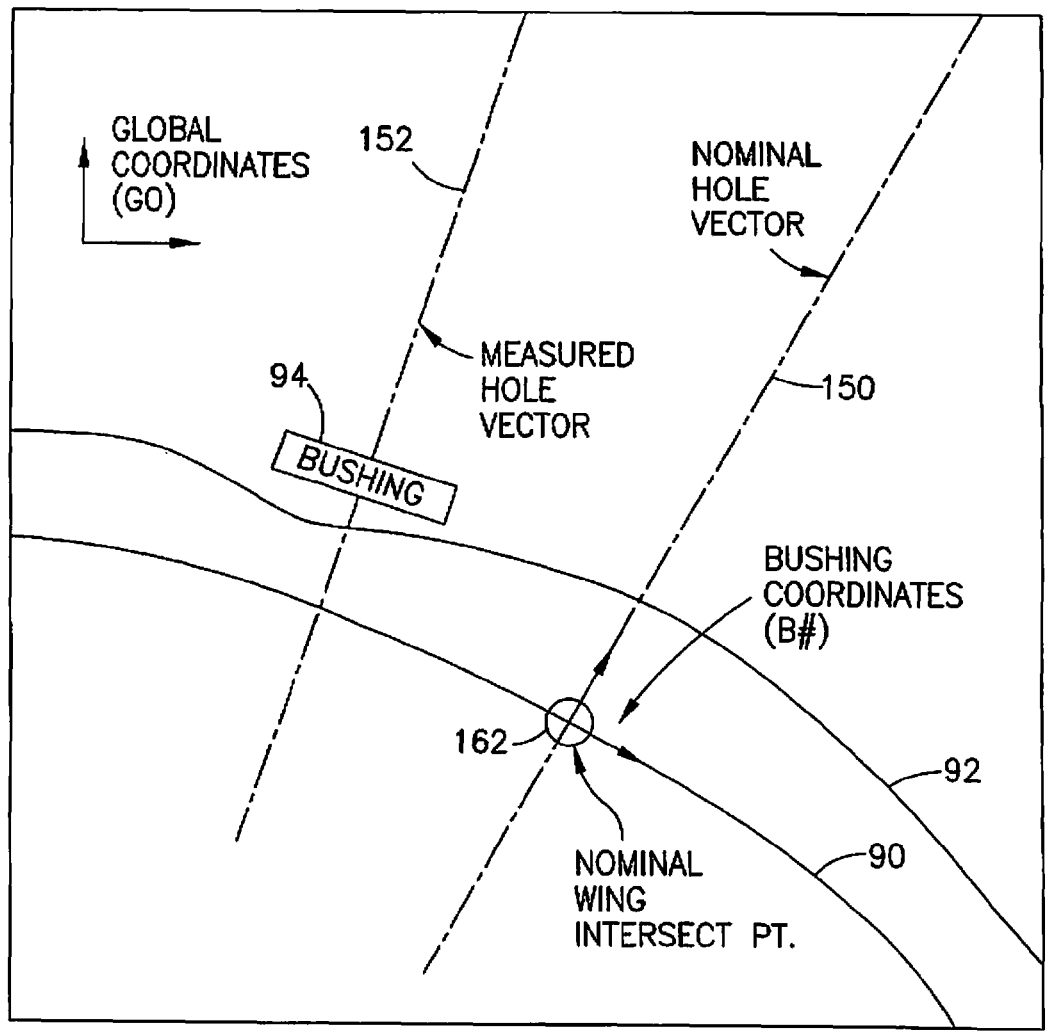

As seen in FIG. 10B, the vector target can be removed after the locations of Points 1 and 2 have been measured. In the next computation, the locations of Points 1 and 2 are transformed from global coordinates into bushing coordinates for comparison with the location of the nominal hole vector 150.

Figure 10C:
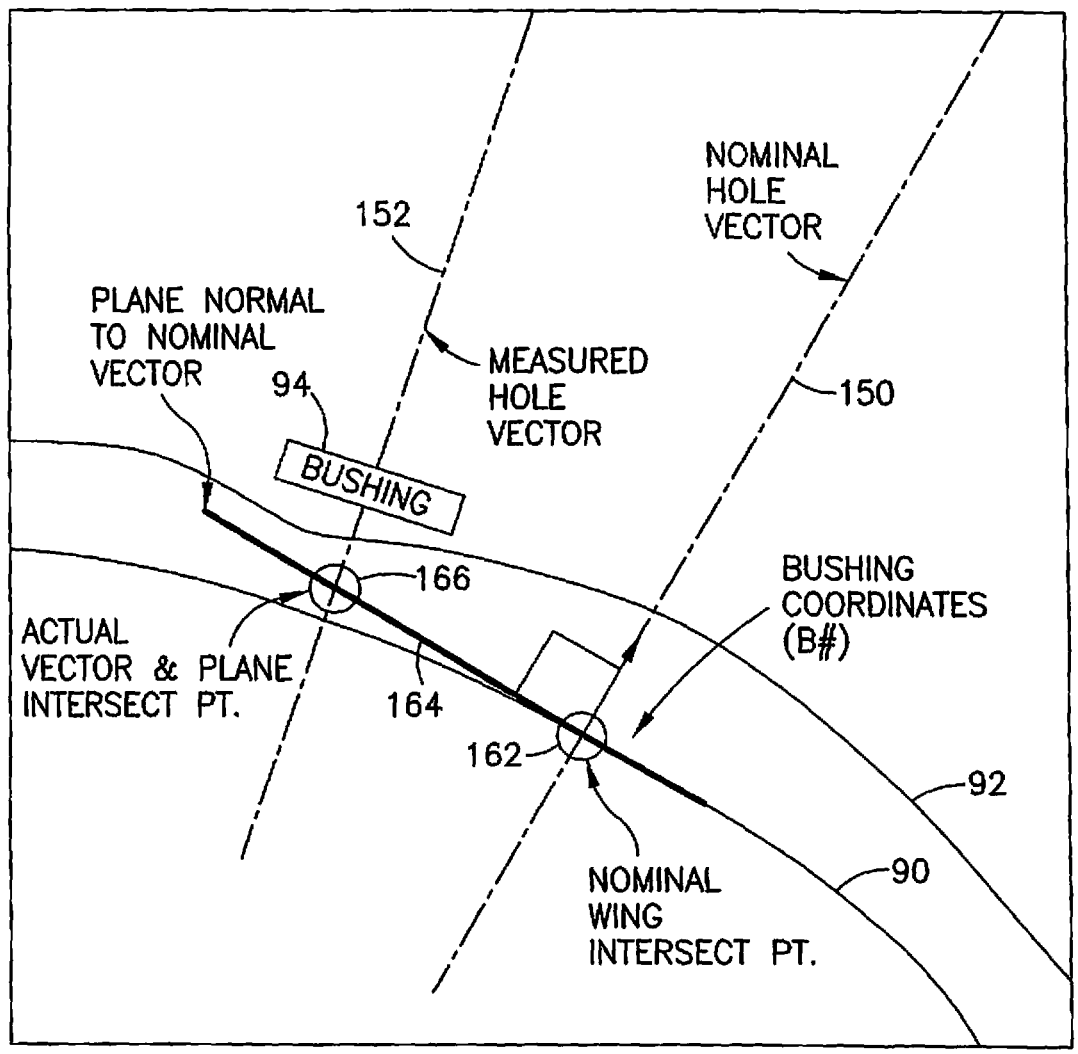

The next step in the computational process is shown in FIG. 10C. Once Points 1 and 2, which define the measured hole vector 152, are in bushing coordinates, the data is processed to determine the distance the drill bushing 94 must be moved. This computation determines the X,Y,Z location in bushing coordinates of the intersection of the measured hole vector 152 and a plane 164 normal to the nominal hole vector 150 which intersects the nominal wing intercept point 162. This plane 164 is indicated by a bold solid straight line (intersecting the nominal hole vector 150 at right angles) in each of FIGS. 10C-10F. The X and Y coordinates of the actual vector/plane intersect point 166 are indicated by a large open circle in FIG. 10C.

Figure 10D:
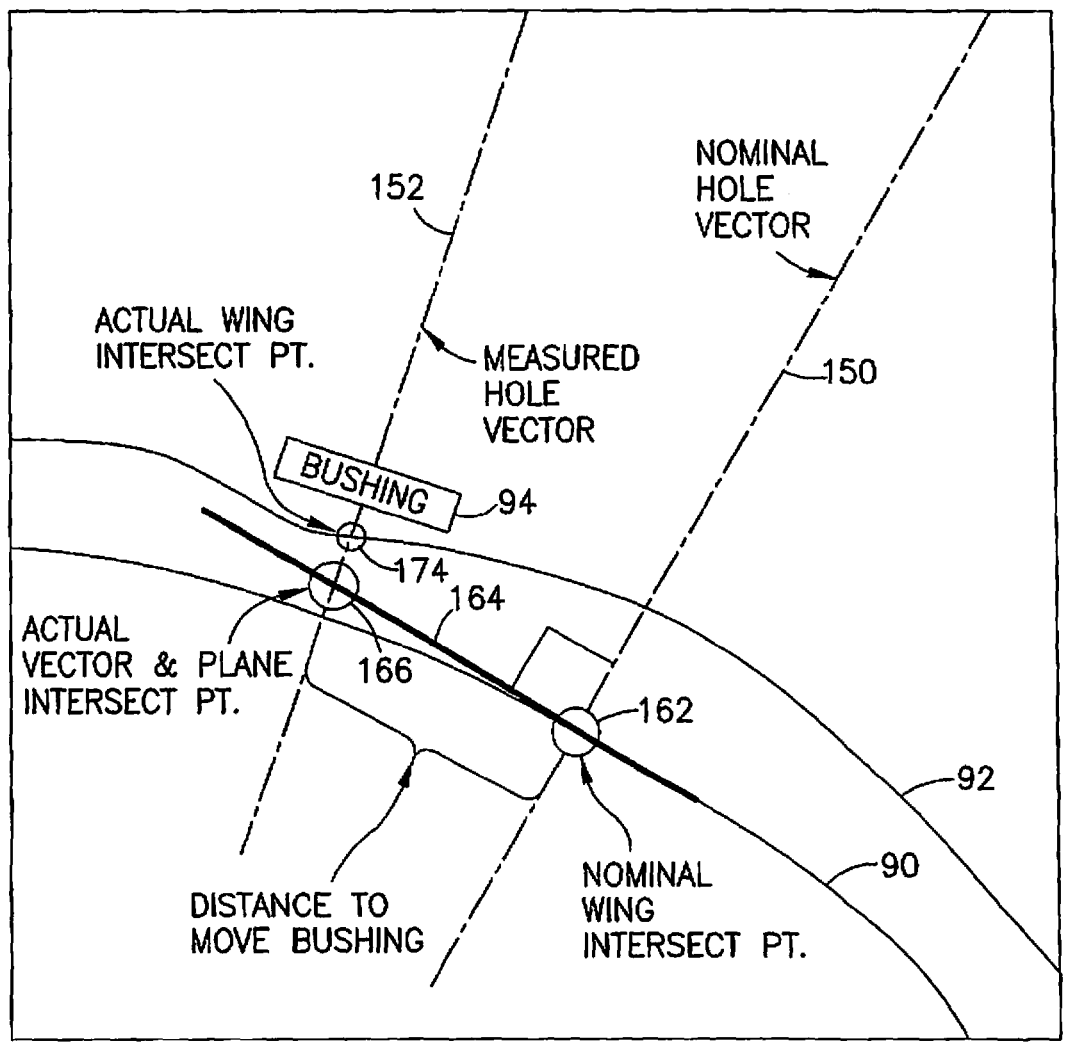

The next step in the computational process is shown in FIG. 10D. The X and Y components of the distance between the actual vector/plane intersect point 166 and the nominal wing intersect point 162 are calculated. The respective distances x and y separating the nominal wing intersect point 162 and the actual vector/plane intersect point 166 represent the components of the distance to move the bushing to the desired drill point, i.e., the distance between the large open circles in FIG. 10D. FIG. 10D also includes an actual wing intersect point 174 (represented by a small open circle) that is the intersection of the actual wing surface 92 and the measured hole vector 152.

Figure 10E:
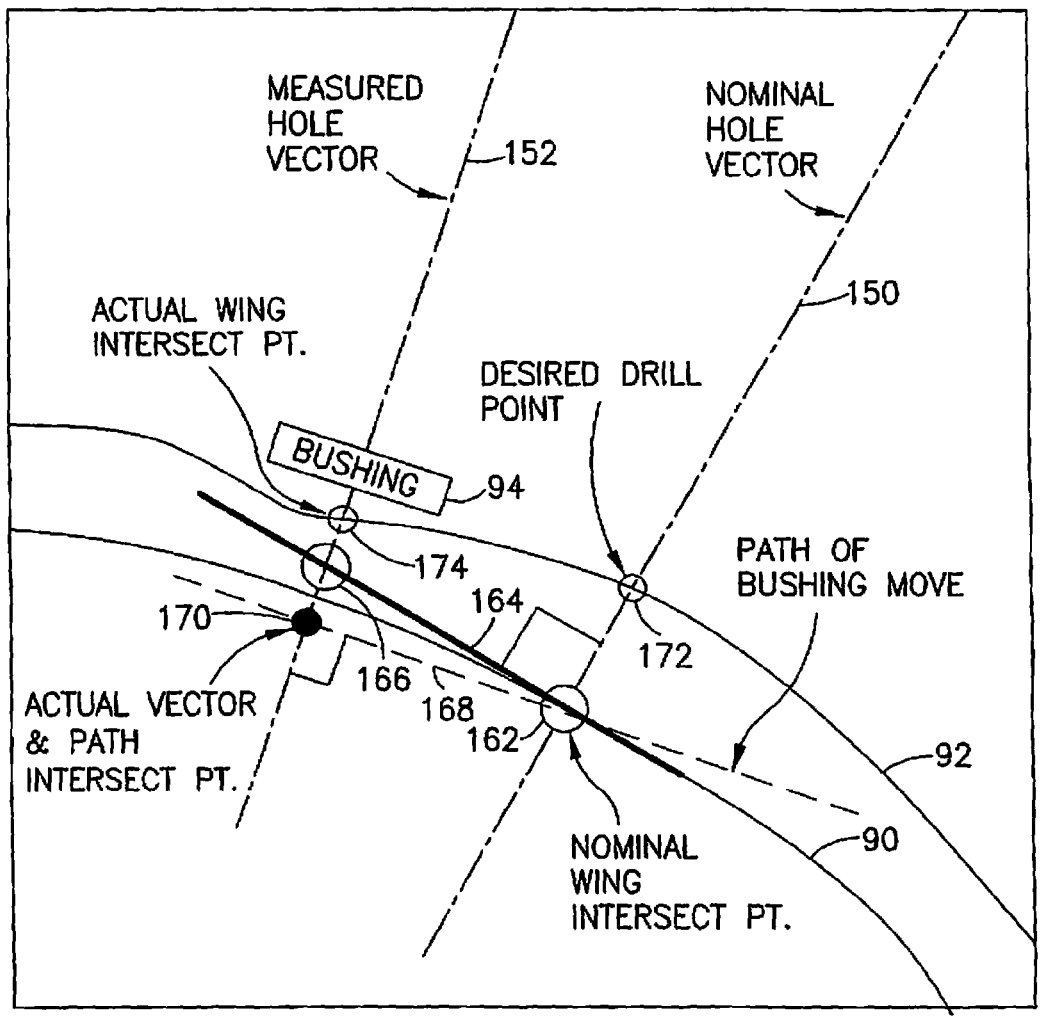

The computed motion path of drill bushing 94 will be along a plane that is normal to the nominal hole vector 150 instead of normal to the measured hole vector 152. This motion path 168 is indicated in FIG. 10E by a dashed straight line which intersects the measured hole vector 152 at an actual vector and path intersect point 170 (indicated by a small closed circle in FIG. 10E). Again the actual wing intersect point 174 is represented by a small open circle in FIG. 10E. The desired drill point 172, i.e., the intersection of the actual wing surface 92 and the nominal hole vector 150, is indicated by a second small open circle in FIG. 10E.

Figure 10F:
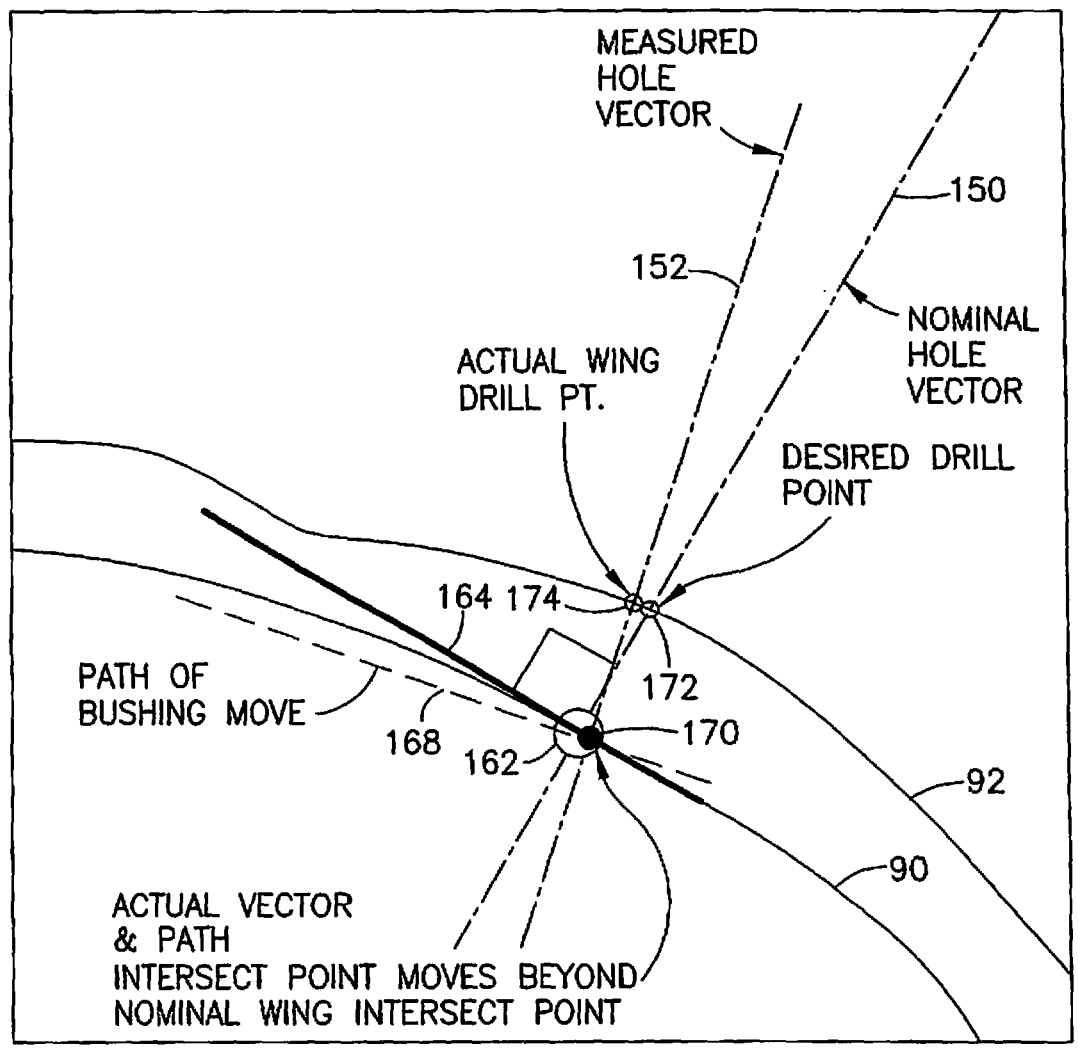

The result of the computations will be instructions to move the drill bushing 94 from the actual wing intersect point 174 to or near the desired drill point 172. A function converts the input x and y values for the desired move into encoder counts which will be sent to the previously described micro servo motors. Those motors will then cause the inner and outer eccentric bushings to rotate by respective angles that will result in the axis of the drill bushing 94 being moved from the actual wing intersect point 174 to the desired drill point 172 (or very close thereto). FIG. 10F shows the situation after the drill bushing 94 has been moved by the computed distance. Since the distance was calculated with respect to the plane 164 normal to the nominal hole vector 150, but the computed path of the drill bushing is in the plane 168 normal to the measured hole vector 152, the actual vector/path intersect point 170 (indicated by the small closed circle in FIG. 10F) may move beyond the nominal wing intersect point 162 (indicated by the large open circle in FIG. 10F). As a result, the actual wing drill point 174 will be close to the desired drill point 172, as seen in FIG. 10F.

In the alternative, the distance that the axis of the drill bushing is moved can be determined based on the point where the measured hole vector 152 intersects a plane that is normal to the measured hole vector 152 and may intersect the nominal wing surface 90 at a point which is offset from the nominal wing intersect point 162.

Code can be used to determine the distance to move the axis of the drill bushing and encoder values. This code can be written with the plane normal to the nominal hole vector 150 (as shown in FIGS. 10A-10F) to reduce the error of the actual drill point 174 on the measured wing surface 92, but code written with the plane 176 normal to the measured hole vector 152 will also work.

As previously mentioned with reference to FIG. 2, a desired move is executed by each double eccentric positioning apparatus in response to motor encoder counts 86, 88 output by the computer system 80 to the micro servo motors 14, 16 respectively. The inner and outer eccentric bushings 34, 56 of each double eccentric positioning apparatus are then rotated to achieve the calculated move and the correct location for each drill bushing 94 (inserted inside and coaxial with the inner eccentric bushing). The DA holes are then drilled while the drill bushings are in their new positions. It should be appreciated that corresponding DA holes will also be drilled in the strut fittings, which will later be located with respect to, aligned with and attached to the wingbox.

FIG. 11 shows a front portion of a wingbox 2 having a pitch load fitting 6 attached to a front spar 4 and a side load fitting 8 attached to a wing skin 66. (The wing skin 66 will be under the wing when the wingbox 2 is attached to a fuselage.) Other strut fittings are not shown in FIG. 11, but see FIG. 24. The wing skin 66 has DA holes (not visible in FIG. 11) drilled therein in the manner described in the preceding paragraph. The side load fitting 8 also has DA holes (not shown in FIG. 11) drilled in its flanges, which DA holes will be aligned with corresponding DA holes in the wing skin 66.

Figure 13:
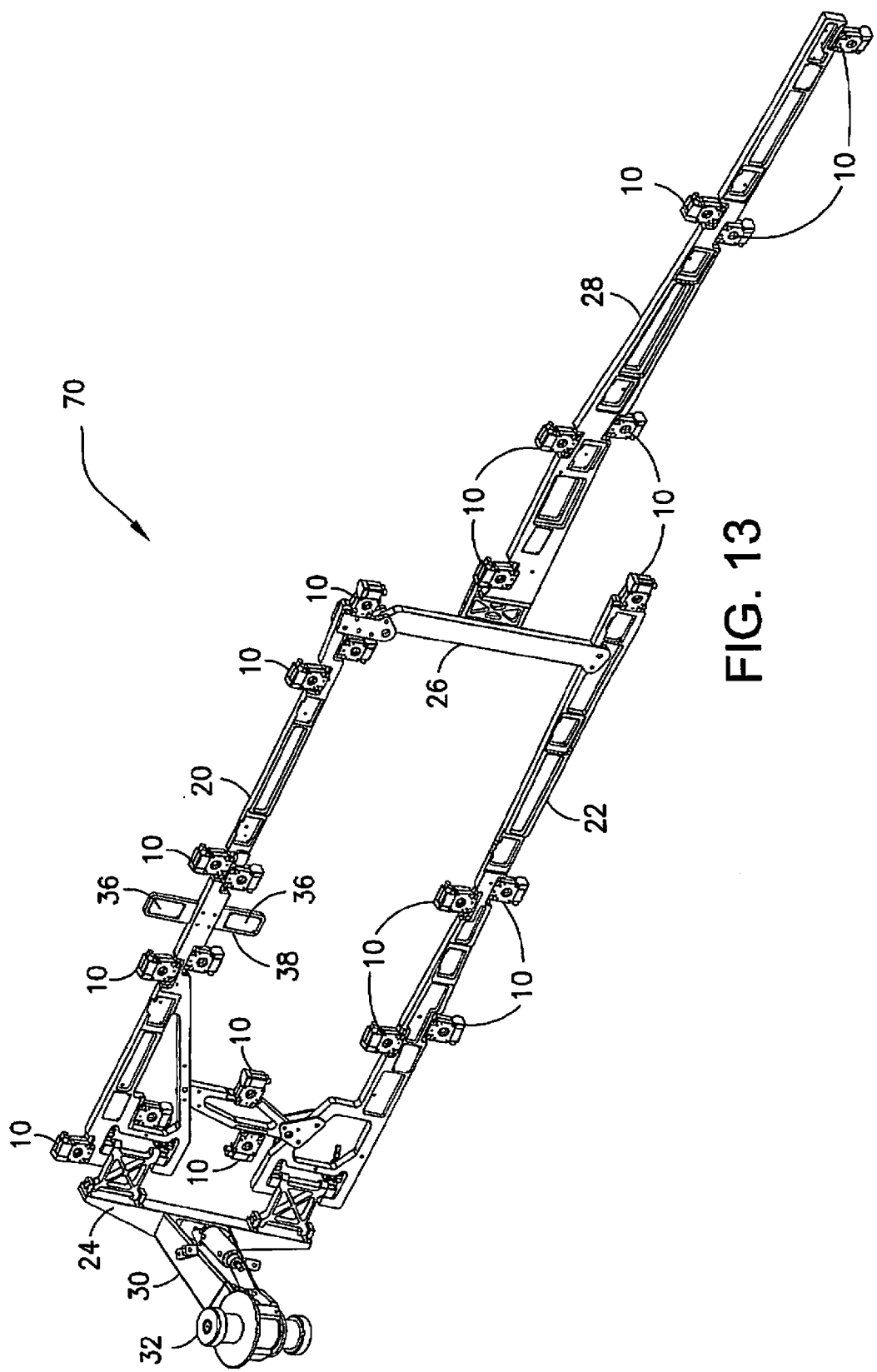

During the locating and drilling processes described in detail above, the drill jig 70 (shown in FIG. 8) is clamped to the wingbox 2 using the pitch load fitting 6 seen in FIG. 11. FIGS. 12 and 13 are respective schematic views (from above and below) of the drill jig 70 shown in FIG. 8. Drill jig 70 comprises first and second backbones 20, 22 having respective first portions pivotably coupled to a first connecting bar 24 and respective second portions rigidly connected to a second connecting bar 26. A third backbone 28 has an end pivotably coupled to the second connecting bar 26, extending in cantilever fashion therefrom. As seen in FIGS. 12 and 13, each of backbones 20, 22 and 28 has a respective plurality of double eccentric positioning apparatuses 10 attached thereto.

Figure 14:
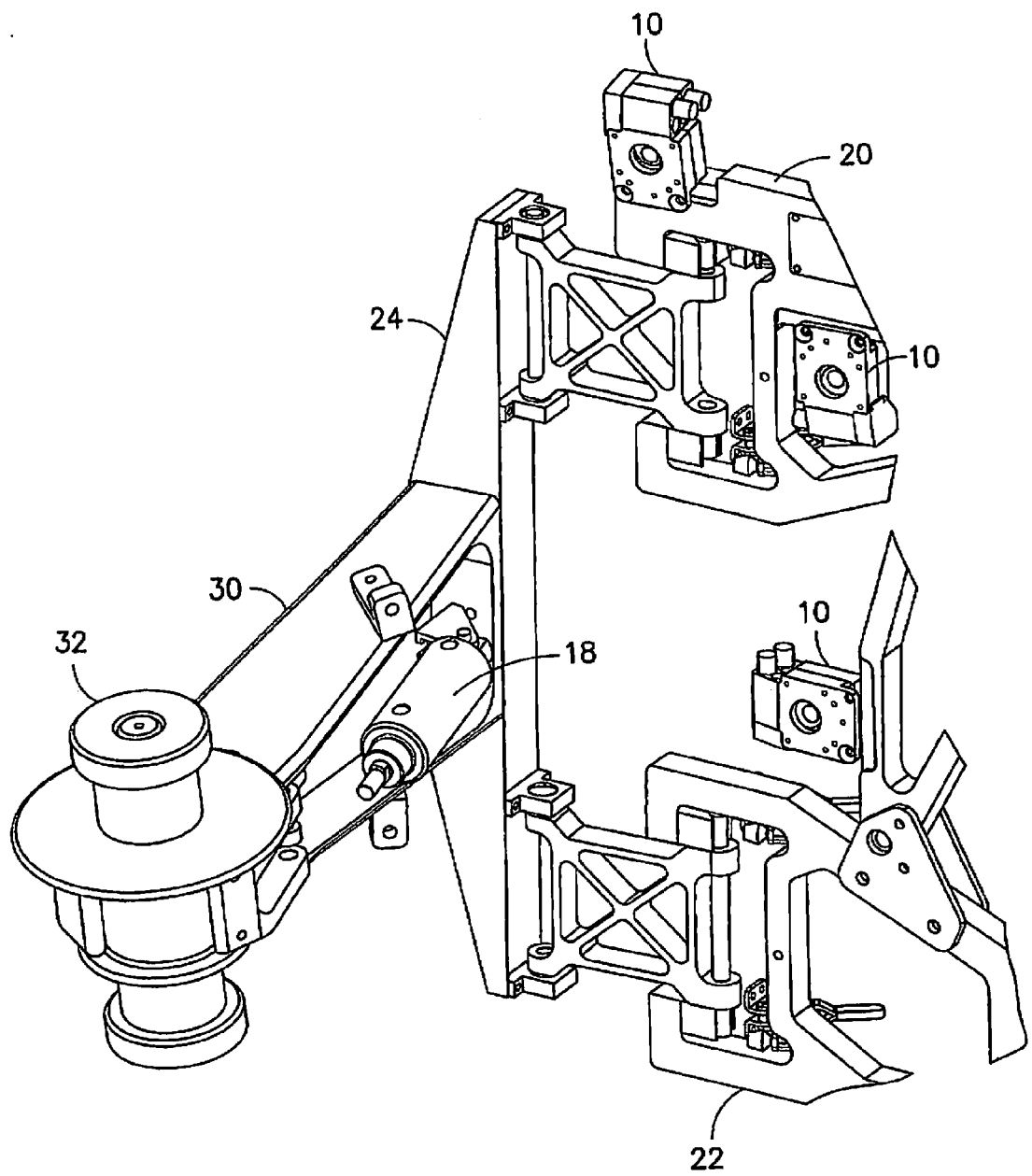
FIG. 14 is a diagram showing a schematic view of the portion of the drill jig of FIG. 8 which clamps to the pitch load fitting shown in FIG. 11.

As best seen in FIG. 14, drill jig 70 further comprises a pitch load fitting clamp 30 connected to the first connecting bar 24, and a pitch load fitting pin 32 coupled to the pitch load fitting clamp 30. The pitch load fitting pin 32 will be inserted in the bores of the pitch load fitting 6 seen in FIG. 11. A pneumatic actuator 18 is actuated to securely clamp the upper portion of the drill jig 70 to the pitch load fitting pin 32.

Referring again to FIG. 12, the drill jig 70 further comprises a suction cup holder 38, which is attached to backbone 20. As seen in FIG. 13, the suction cup holder 38 holds a pair of suction cups 36 which respectively produce suction forces that hold backbone 20 in place on the wing skin 66 of the wingbox 2 (see FIG. 8).

The drill jig 70 can be secured to the wingbox 2 by means of pitch load fitting clamp 30 and suction cups 36 until the drilling process has been completed. After the specified DA holes have been drilled in the wing skin 66 of the wingbox (step 110 in FIG. 3), the drill jig 70 will be removed (step 112 in FIG. 3). DA holes are also drilled in each strut fitting (including side load fitting 8 shown in FIG. 11). The next phase of the assembly process is shimming each strut fitting to the wingbox. Predictive shimming is achieved by virtually fitting the strut features to the wing features per engineering requirements. The corresponding shim gaps are then used to develop surfaces and subsequent shimming models.

Figure 15:
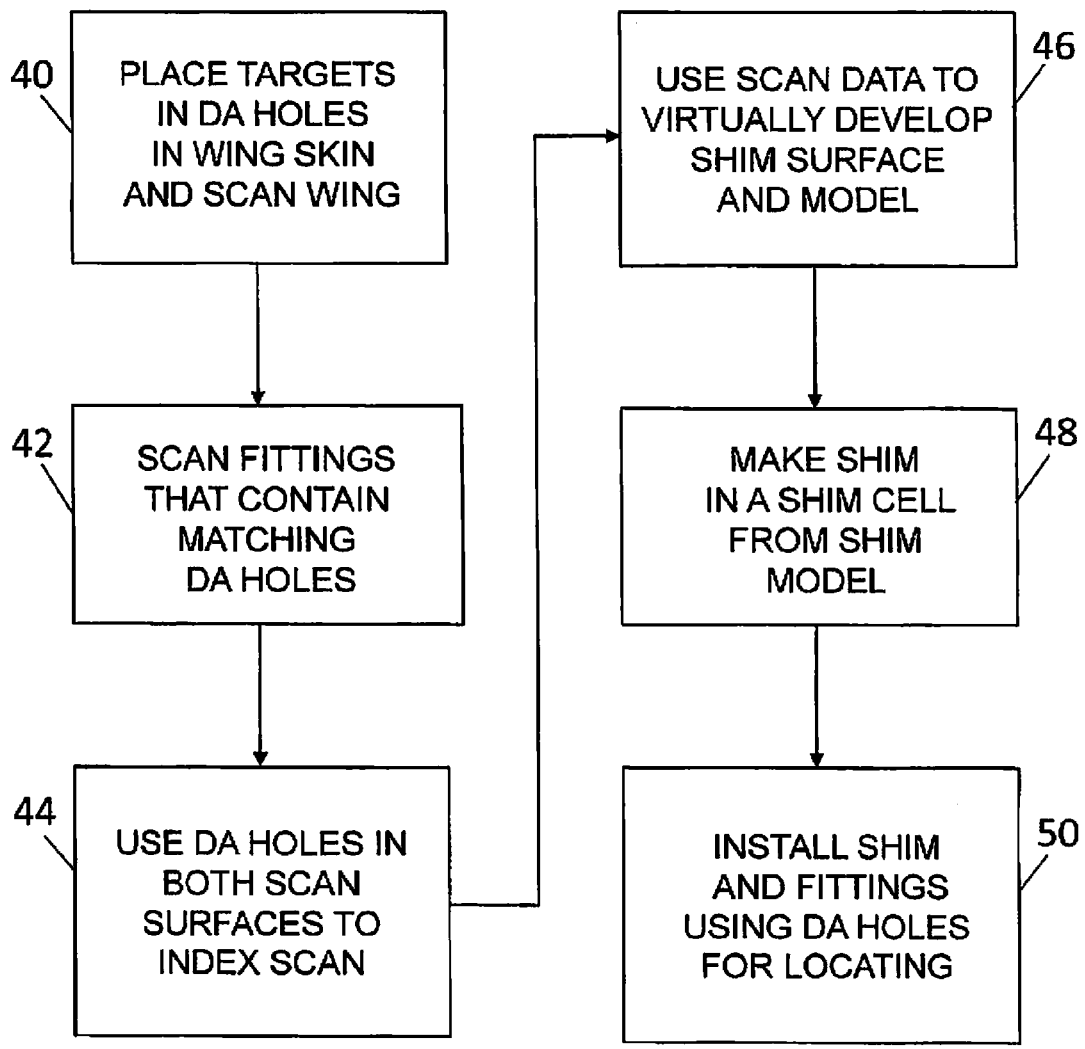
FIG. 15 is a flowchart showing steps of a shimming process in accordance with one embodiment.
Figure 16:
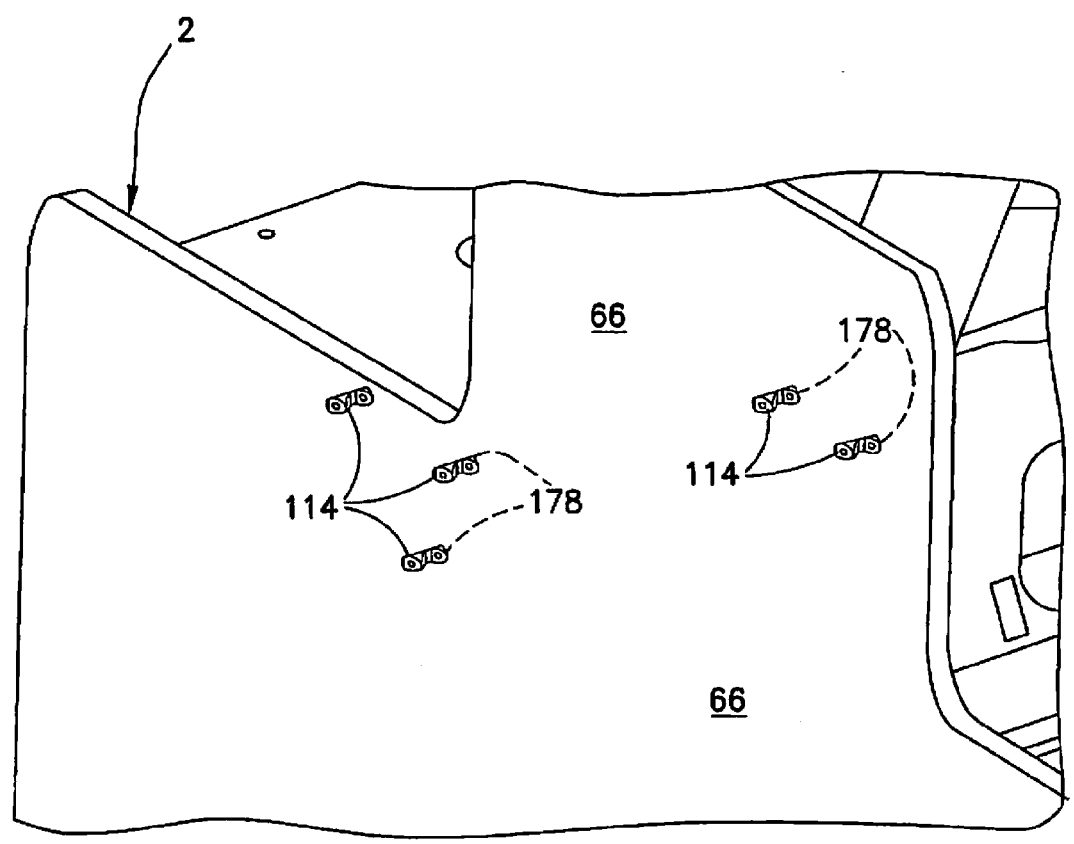
FIG. 16 is a diagram showing a schematic view of a portion of a skin of a wingbox having optical targets inserted in a multiplicity of DA holes.

FIG. 15 shows steps of a shimming process in accordance with one embodiment. Optical targets are placed in the DA holes in the lower skin of the wingbox and then the wing surface is scanned using an optical 3-D scanner (e.g., the ATOS optical 3-D scanner commercially available from Gesellschaft für Optische Messtechnik) (process 40). In addition, strut fittings having DA holes that match the DA holes in the wingbox are scanned with optical targets placed in their DA holes (process 42). FIG. 16 shows a portion of a wing skin 66 of a wingbox 2 having vector targets 114 inserted in a multiplicity of DA holes 178.

The DA holes are measured using a procedure similar to that described above with reference to FIGS. 7A and 7B. The hole measure data is point data derived from optical targets, i.e., vector targets. When the surface of a part having DA holes is scanned, the 3-D scanner also captures point values from the vector targets that were inserted into the holes. The scanner recognizes the contrasting white dots on the vector targets as measurement points and derives a point value at the center of the white dots. Thus when the hole measure data is imported, it consists of point cloud scan data representing the scanned surface along with points that define the axis of each hole. The vector targets give two points per hole location, which in turn is used to define the position and orientation of the hole axis.

In addition, the 3-D scanner collects a very dense set of mesh data. From this mesh data, the computer system can extrapolate large quantities of points which define the actual surface location and provide an accurate representation of the actual surfaces being measured. Commercially available 3-D scanners can have point densities as high 16 million points per square foot. The use of such a high-density 3-D scanner enables better capture of the surface definition.

The 3-D scanner produces dense point clouds that capture precisely the full surface geometry of the wingbox 2 and each strut fitting 8. The locations of the DA holes in each strut fitting 8 and the locations of the DA holes 178 in the wing skin 66 are used to index (i.e., align) one set of measurement data to the other (process 44). The measured data for each strut fitting 8 is aligned with the measured data for the wing skin 66 by means of bore-to-bore relationships, minimum-maximum shim thickness allowables, and DA hole alignment. The aligned scan data is then used to develop a virtual shim surface and model for each strut fitting 8 (process 46). A virtual shim shape is created for each strut fitting 8 based on a combination of the respective point cloud surfaces. Thereafter, respective shims (not shown) are made in a shim cell from the respective shim models (process 48). Finally, the shims and strut fittings 8 are installed on the wingbox 2 using the DA holes 178 for correct location of the strut fittings 8 (process 50).

Figure 17:
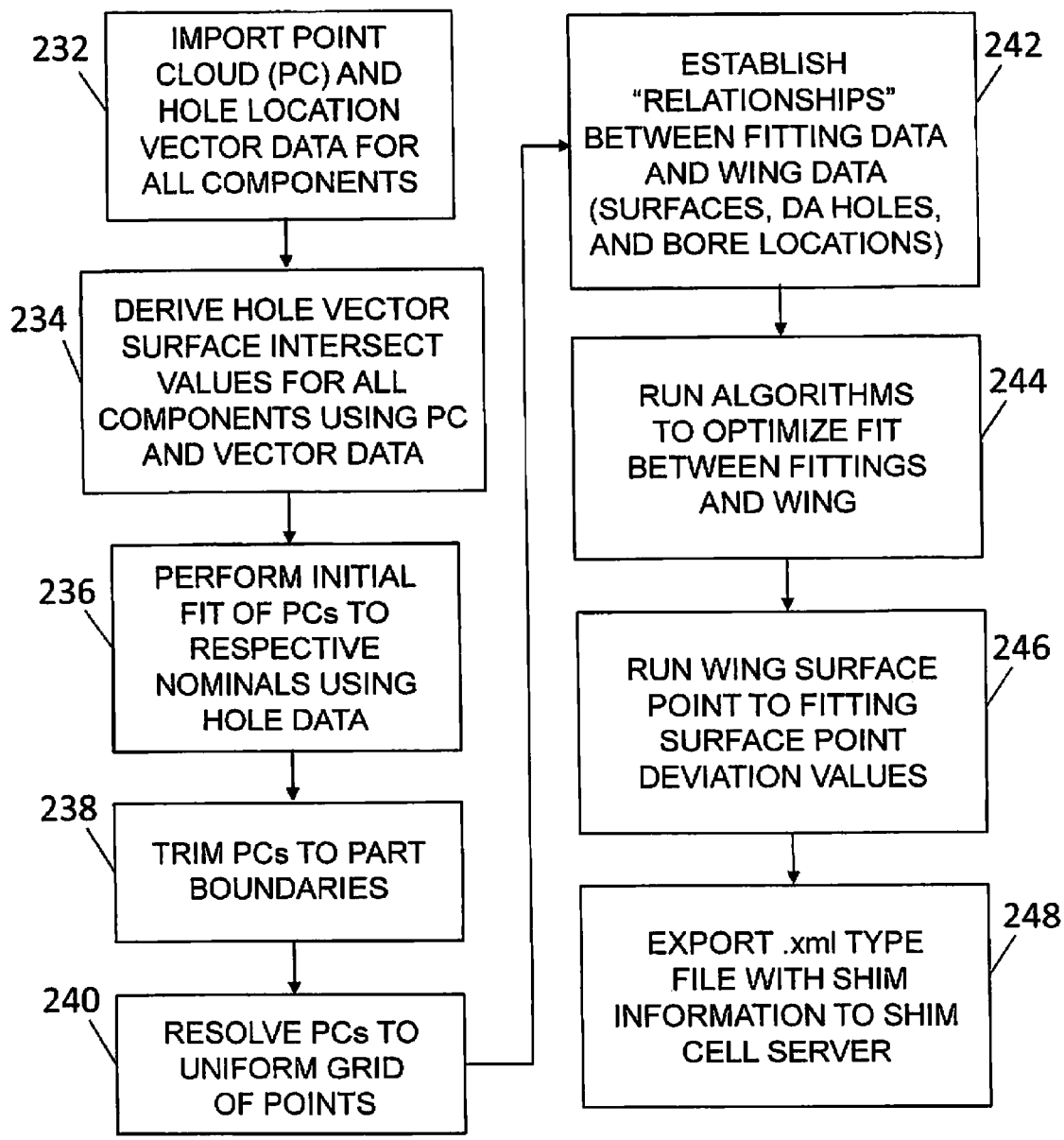
FIG. 17 is a flowchart showing steps of a shim surface development process in accordance with one embodiment.

FIG. 17 is a flowchart showing steps of the shim surface development process 46 (see FIG. 15) in accordance with one embodiment. This process is performed by the computer system. The measured data (hereinafter "scan data") is processed in order to be used for calculating the optimum placement of the strut fittings 8 relative to the wing skin 66 (see FIG. 11). The processing of wing skin scan data 52 is shown in FIGS. 18 to 23. The fitting data processing is similar.

Figure 18:
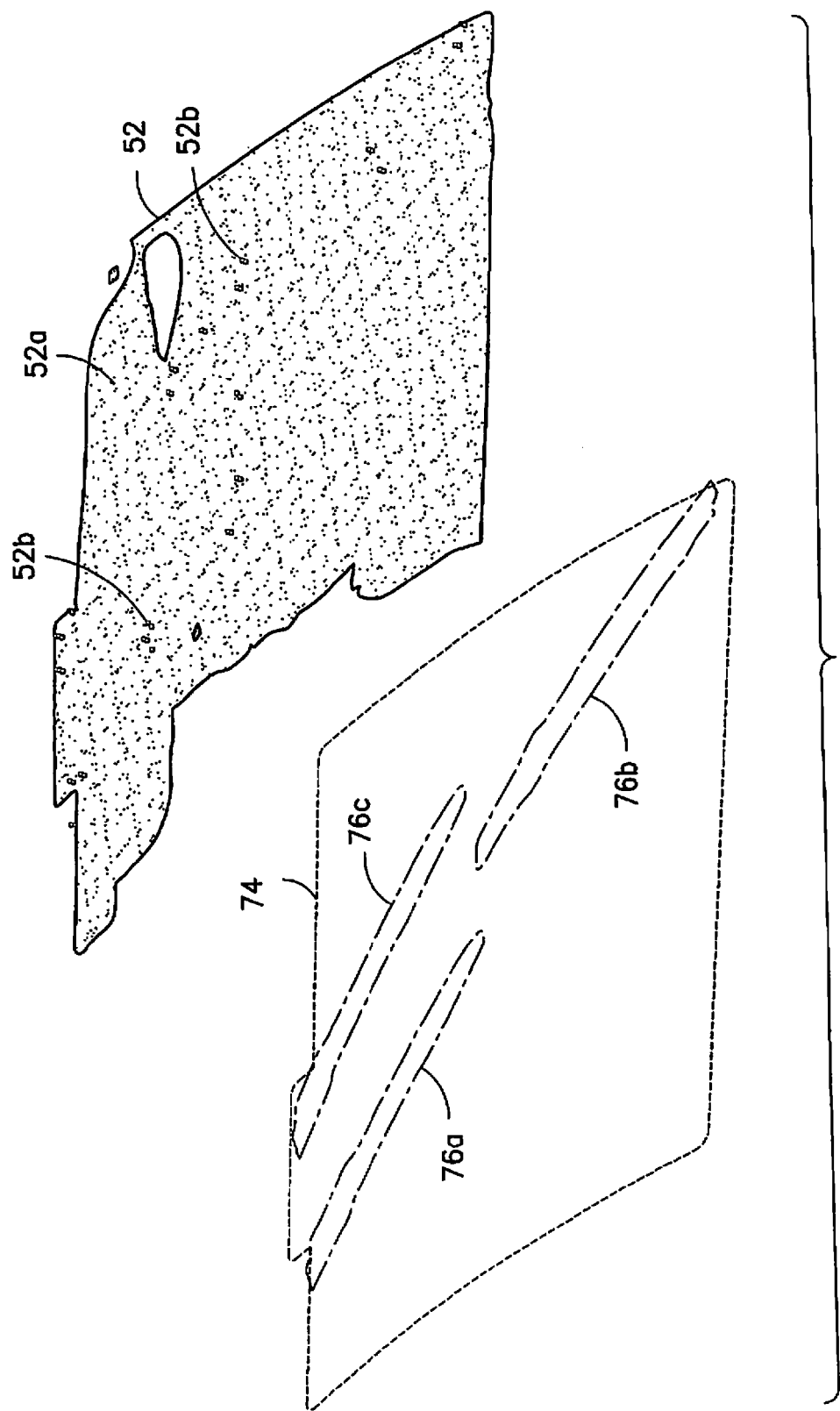
FIG. 18 is a diagram representing aspects of the process whereby point cloud data and hole location data are acquired from the scanned surface of a wingbox. The nominal locations of an inboard side load fitting, an aft diagonal brace fitting and an outboard side load fitting relative to a nominal location of the wing surface are also shown.

FIG. 18 is a diagram representing aspects of the process whereby wing skin scan data 52, comprising point cloud data 52a and hole location data 52b, are acquired from the wingbox surface by scanning. The nominal boundaries 76a-76c depicted in FIG. 18 represent the respective boundaries of an inboard side load fitting (nominal boundary 76a), an aft drag brace fitting (nominal boundary 76b) and an outboard side load fitting (nominal boundary 76c) relative to the location of a nominal skin boundary 74.

Referring again to FIG. 17, after scan data has been acquired from all components, that point cloud and hole location vector data is exported from the 3-D scanner to the computer system (step 232). The hole location vector data for the wing skin 66 of the wingbox 2 comprises the points derived from the DA holes 178 that were measured using vector targets 114 (see FIG. 11). Similar hole location vector data can be acquired by scanning the DA holes in the strut fittings using optical targets. The hole location vector data defines the locations of the as-drilled DA holes in the wing surface and the strut fittings.

Still referring to FIG. 17, the computer system processes the imported scan data in order to utilize a fitting algorithm (described below). First, the computer system derives hole vector intersect values (i.e., the intersection of the hole vector with a virtual surface extrapolated from the measured surface surrounding a hole) for all components using the imported scan data (i.e., the point cloud and hole location vector data) (step 234). In order to later orient the scan data relative to the nominal Engineering dataset for correctly determining the deviations from nominal, the computer system calculates the surface values at the DA hole locations. The point cloud surface points surrounding the holes are averaged with a new point created on the measured hole vectors with their Z values derived from those averages.

Figure 19:
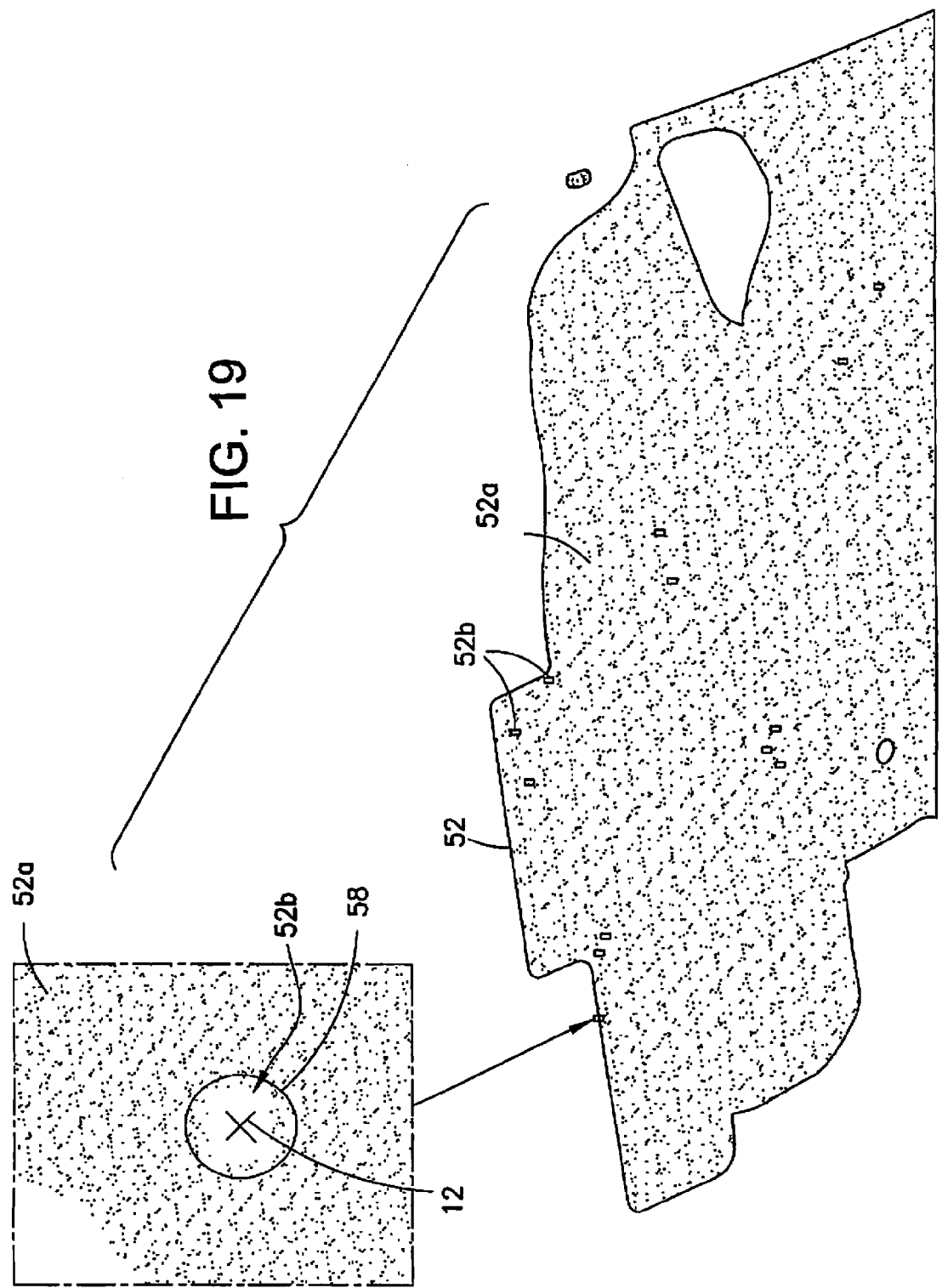
FIG. 19 is a diagram representing aspects of a process for deriving hole vector/surface intersect points for the wingbox.

Aspects of this hole vector intersect derivation process are shown in FIG. 19, which includes a low-resolution graphical representation of wing scan data 52 and a high-resolution graphical representation (i.e., the inset) of a subset of the wing scan data 52 corresponding to that portion of the wing surface in the vicinity of a DA hole. As seen in the inset in FIG. 19, the computer system defines a radial search area 58 around each measured hole vector (i.e., the axis of the DA hole). The location 12 of a representative measured hole vector is indicated by a "+" symbol in FIG. 19. Each dot within the inset represents a respective point cloud point. Point cloud points that fall within the radial search area 58 around the location 12 of the measured hole vector are used to calculate a surface point along each measured hole vector. Hole vector intersect values are also derived for each strut filling 8.

Referring again to FIG. 17, the computer system uses the newly created points (i.e., the derived hole vector intersect values) to perform an initial best fit of the point cloud data and measured hole vector data to respective nominal Engineering data for the wing skin and each strut fitting (step 236).

Figure 20:
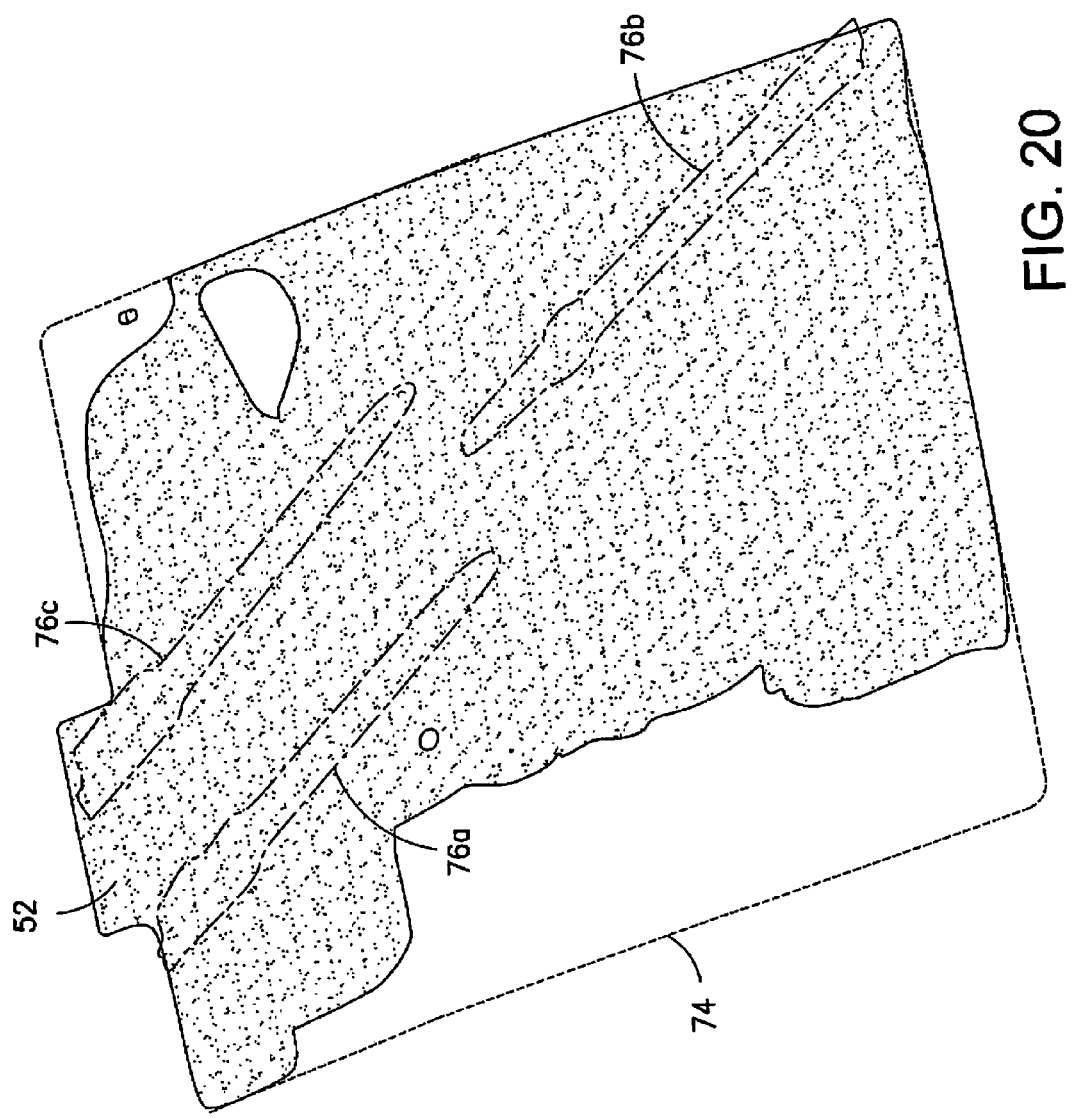
FIG. 20 is a diagram representing aspects of a process for performing a best fit of wing surface point cloud data to nominal wing surface data.

FIG. 20 is a diagram representing aspects of a process for performing a least squares best fit of wing surface scan data 52 to the location of the nominal wing surface 74. The nominal boundaries 76a-76c of the inboard and outboard side load fittings and the aft drag brace fitting are also shown.

Referring again to FIG. 17, the computer system is further programmed to trim the point clouds to conform to the boundaries of the components (step 238). When measuring with the 3-D scanner, the scanner picks up everything in view, including portions of the wing and fittings which are not used in the fitting process. In order to reduce errors in subsequent processing, this extraneous data is removed in step 238. The boundary is the outline definition of each part surface. Any data that falls outside of these boundaries is removed.

Figure 21:
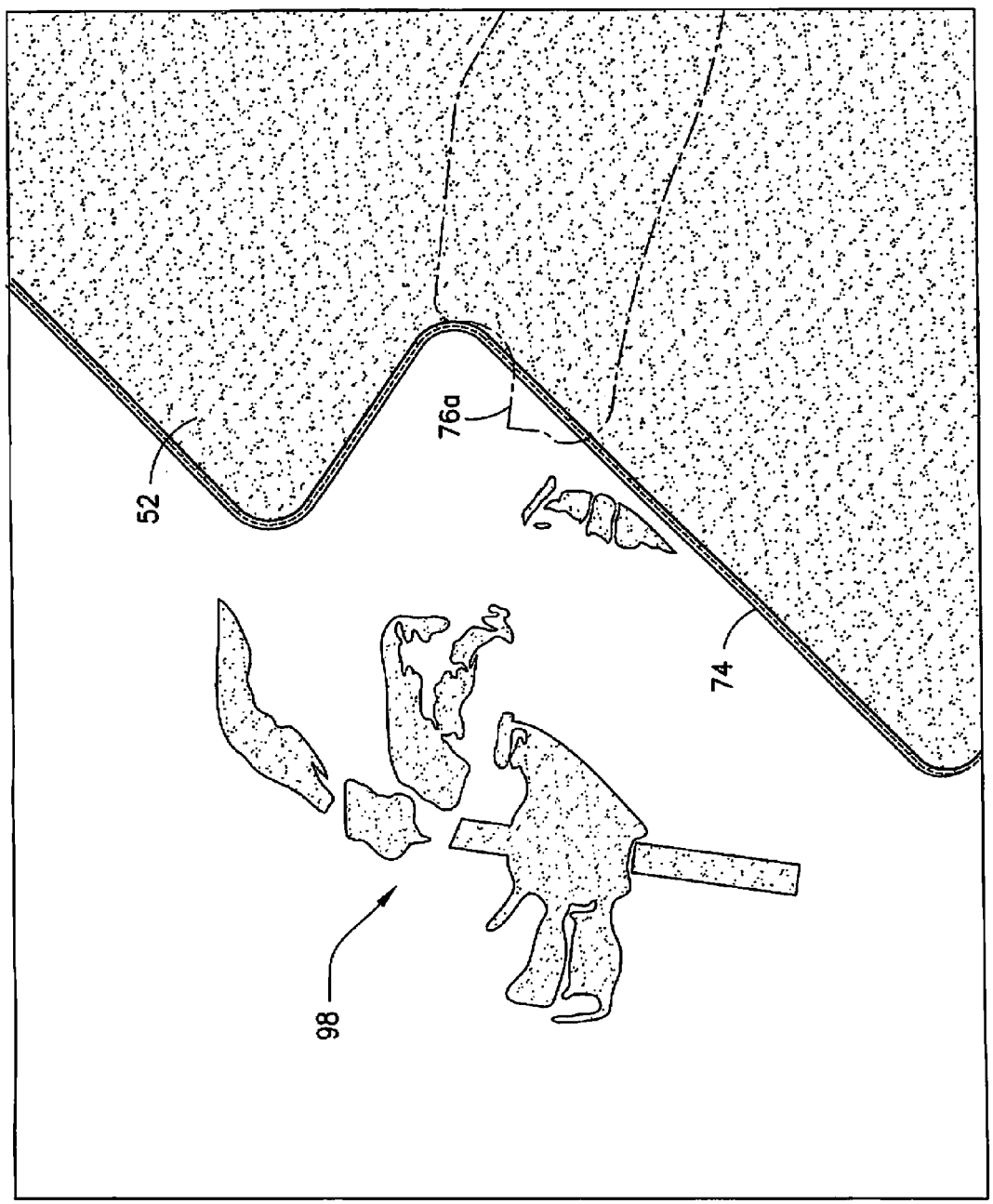
FIG. 21 is a diagram representing aspects of a process for trimming wing surface point cloud data to eliminate extraneous data.

Aspects of the process for trimming wing surface scan data 52 to eliminate extraneous data are shown in FIG. 21. Extraneous data 98 located outside the nominal skin boundary 74 will be eliminated.

In order for the later algorithms to work efficiently, the number of data points remaining after trimming is further reduced to a manageable amount by evaluating the point cloud data points that surround a predefined set of nominal vectors. These nominal vectors are evenly spaced in the defined shim areas to form a uniform grid. Following trimming, the point clouds are resolved to a uniform grid of points by extrapolating discrete point locations from the point cloud data (step 240). An extrapolation method in accordance with one embodiment uses a uniform grid of nominal vectors which pierce the point cloud data. Where the nominal vectors pass through the point cloud data, all of the point cloud points within a certain radius of each nominal vector are gathered. More specifically, for each vector a radial search is done to identify point cloud points which fall within that area (in a manner similar to what is depicted in FIG. 19). The radius is defined by the user. The surface deviation values (i.e., deviation from nominal value) of all the point cloud points in that area are then averaged, with a new point being created at that averaged offset value along the nominal vector. More specifically, the Z values of the point cloud points within a radius are averaged and then that average Z value is assigned to a new point that is created at that nominal vector's X and Y location. This is done for each nominal vector in the uniform grid. The end result is a new set of evenly spaced points (each point having X, Y, Z coordinates) that represent the deviations of the actual measured surface from the nominal surface.

Figure 22:
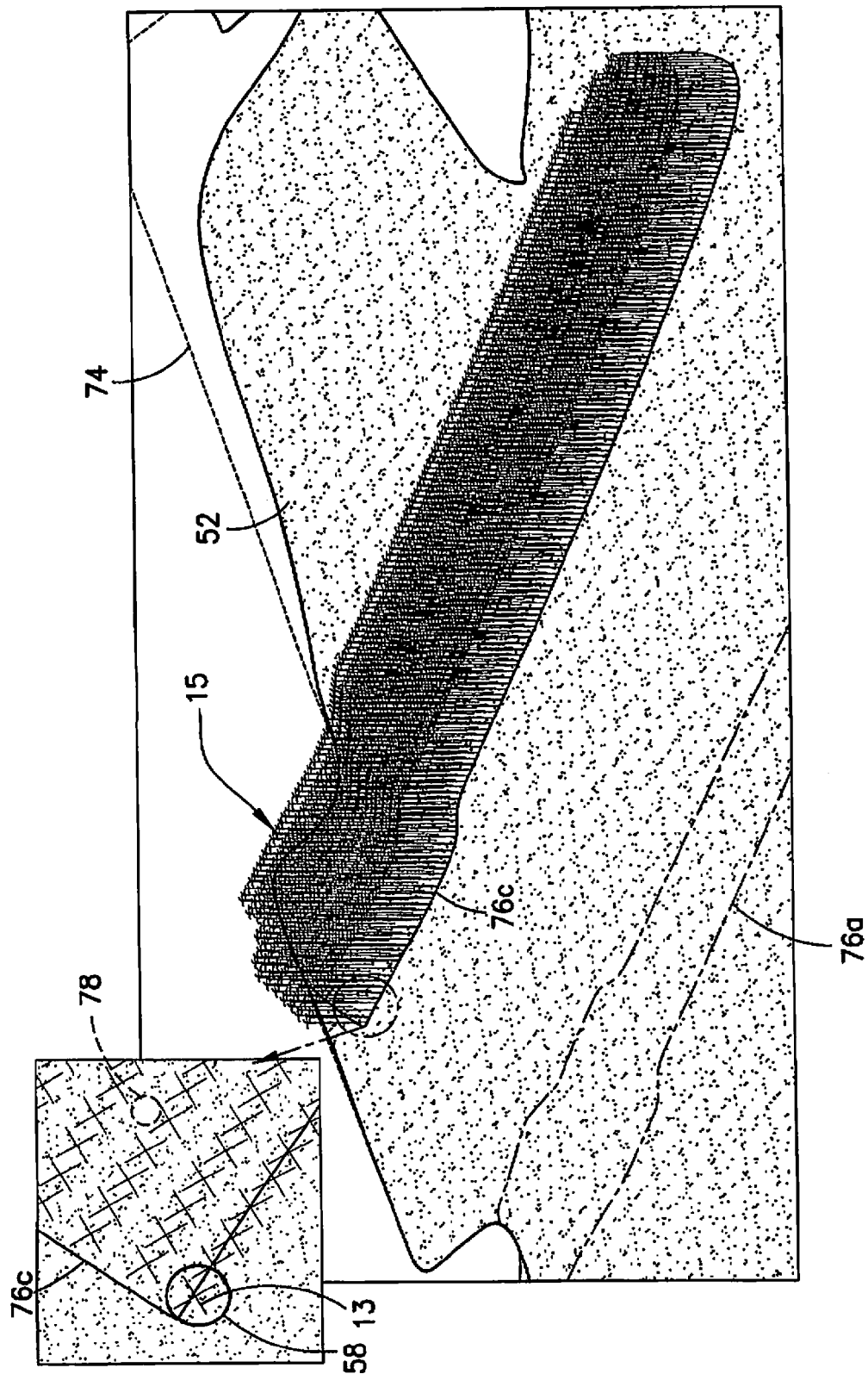
FIGS. 22 and 23 are diagrams representing aspects of a process for resolving the wing surface point cloud data into a uniform grid of points.
Figure 23:
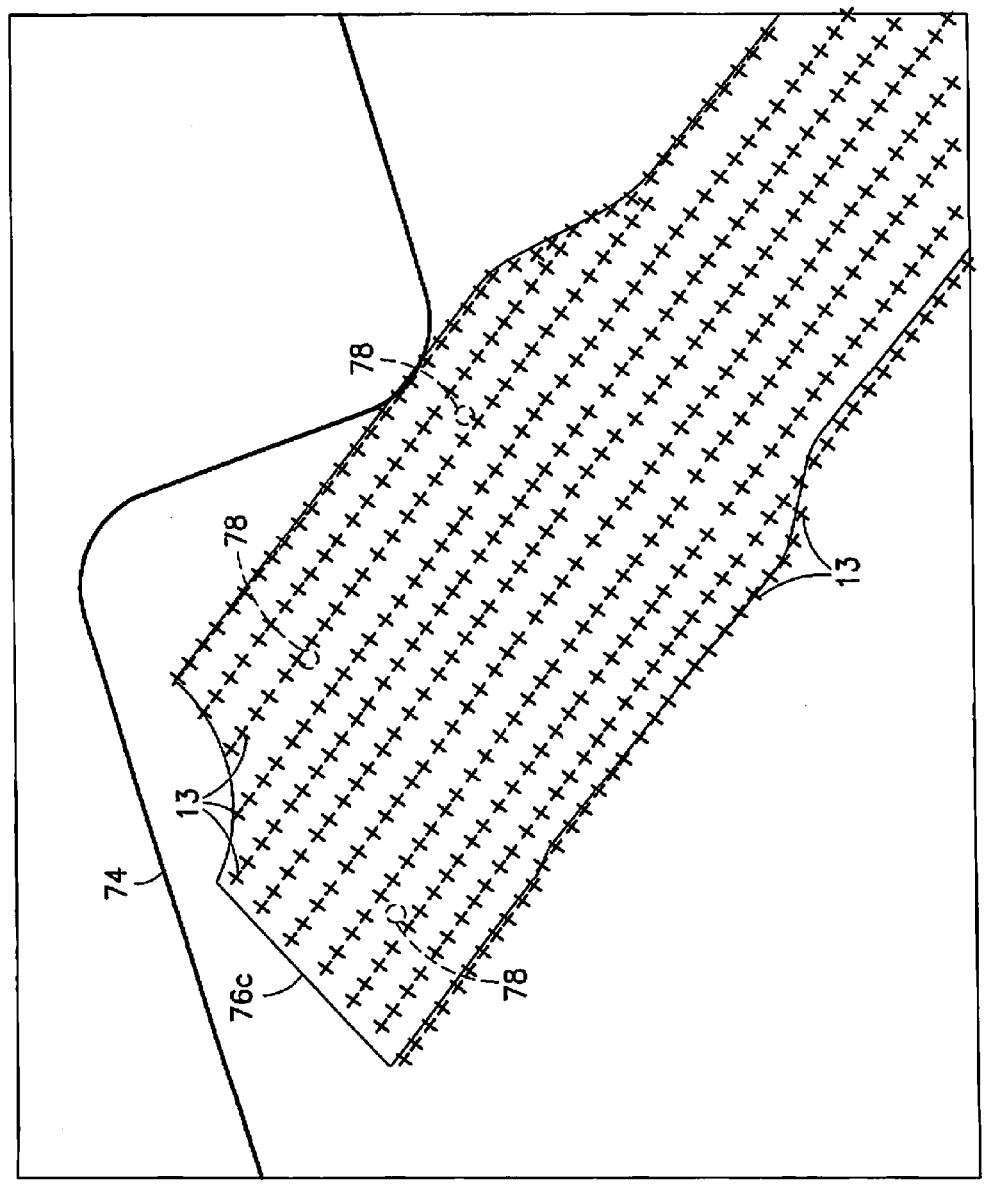

FIGS. 22 and 23 are diagrams representing aspects of a process for resolving the wing surface point cloud data into a uniform grid of points. A similar process is used to derive deviations of each strut fitting surface from the corresponding nominal surface. As seen in FIG. 23, the resulting uniform grid of points (having X,Y,Z coordinates) are at uniformly spaced locations 13 within the nominal boundary 76c of the inboard side load fitting (not shown). As seen in FIG. 22, a multiplicity of nominal vectors 15 intersect the uniformly spaced locations within the defined shim area bounded by the nominal boundary 76c. A respective wing skin deviation Z value is computed for each vector 15. First, the nominal Z values for each nominal vector are derived from the nominal data. Then the corresponding measured Z values are computed by averaging the surrounding point cloud points in wing skin scan data 52 for each nominal vector location. (The dashed circles 78 in FIGS. 22 and 23 indicate holes in the point cloud data corresponding to DA holes in the wing skin.) A wing skin deviation Z value can then be derived for each nominal vector 15 from the difference between the corresponding measured and nominal Z values for that vector. Similar computations are performed for each strut fitting to derive strut fitting deviation Z values.

Referring again to FIG. 17, upon completion of step 240, the computer system then establishes relationships between the strut fitting scan data and the wing skin scan data based on surfaces, DA holes and bore locations (step 242). Relationships are created for all of the Engineering requirements to be satisfied. A relationship is evaluating one measured point relative to another measured point, such as side load fitting bore point relative to pitch load fitting bore point. All of these requirements have nominal values with minimum and maximum allowables. For example, the shim gap must be greater than 0.0XX inch yet smaller than 0.0YY inch at any point between the wing skin and the fitting.

After relationships have been established, algorithms are run to optimize the fit between the fittings and the wingbox (step 244). The fitting algorithm looks at key measurement-to-measurement relationships and determines the optimum position in space of each fitting that will satisfy all of the Engineering requirements. These determinations are based on trying to keep the relationships within predefined distance or angular boundaries.

Figure 24:
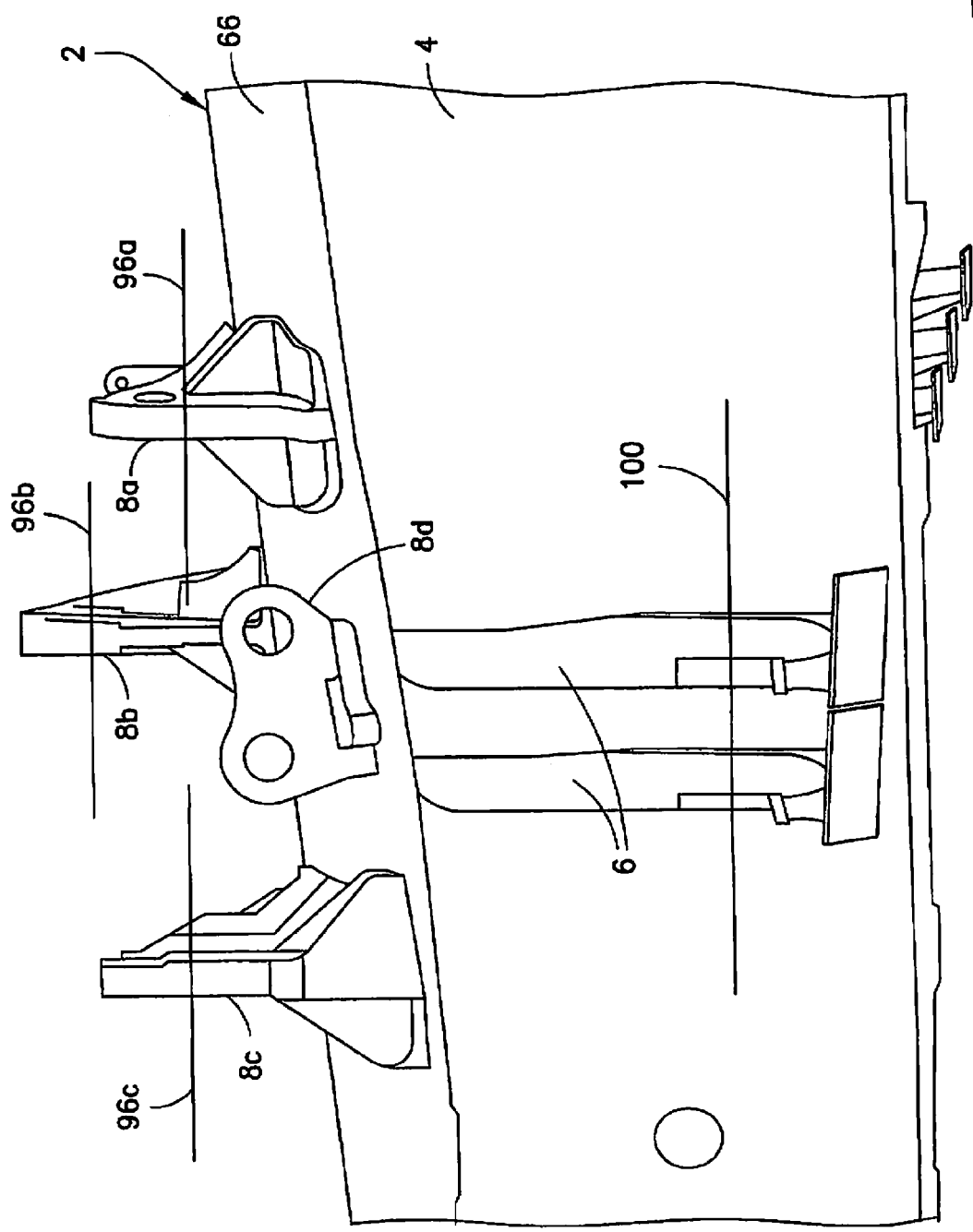
FIG. 24 is a diagram showing a schematic view of a front portion of a wing box with fittings attached thereto.

FIG. 24 is a schematic view of a front portion of a wing box 2 having a front spar pitch load fitting 6 attached to the front spar 4 and having the following additional fillings attached to the wing skin 66: (1) an inboard side load fitting 8a having a bore axis 96a; (2) an aft drag brace fitting 8b having a bore axis 96b; (3) an outboard side load fitting 8c having a bore axis 96c; and (4) a side load link fitting 8d. The front spar pitch load fitting 6 has a bore axis 100.

In accordance with one implementation, boundaries are specified for each of the following fitting requirements which are inputs to the fitting algorithm: (1) the distances between the bore axes of adjacent fittings 8a-8c, the axes being developed from measurement points; (2) the relative angles of the bore axes of adjacent fittings 8a-8c; (3) the distances from the bore axis 100 of the front spar pitch load fitting 6 to the respective bore axes of adjacent fittings 8a-8c; (4) the angles of the bore axes of adjacent fittings 8a-8c relative to the bore axis 100 of the front spar pitch load fitting 6; (5) the positions of the DA holes in fittings 8a-8d relative to the positions of the DA holes in the wing skin 66; and (6) the shim gaps (determined from surface measure points) between the fitting surfaces and the wing surface. For example, the angle of the as-measured bore axis of the inboard side load fitting 8a relative to the as-measured bore axis of the front spar pitch load fitting 6 can be specified to be 0.XX degrees ±0.0Y degrees.

Figure 25:
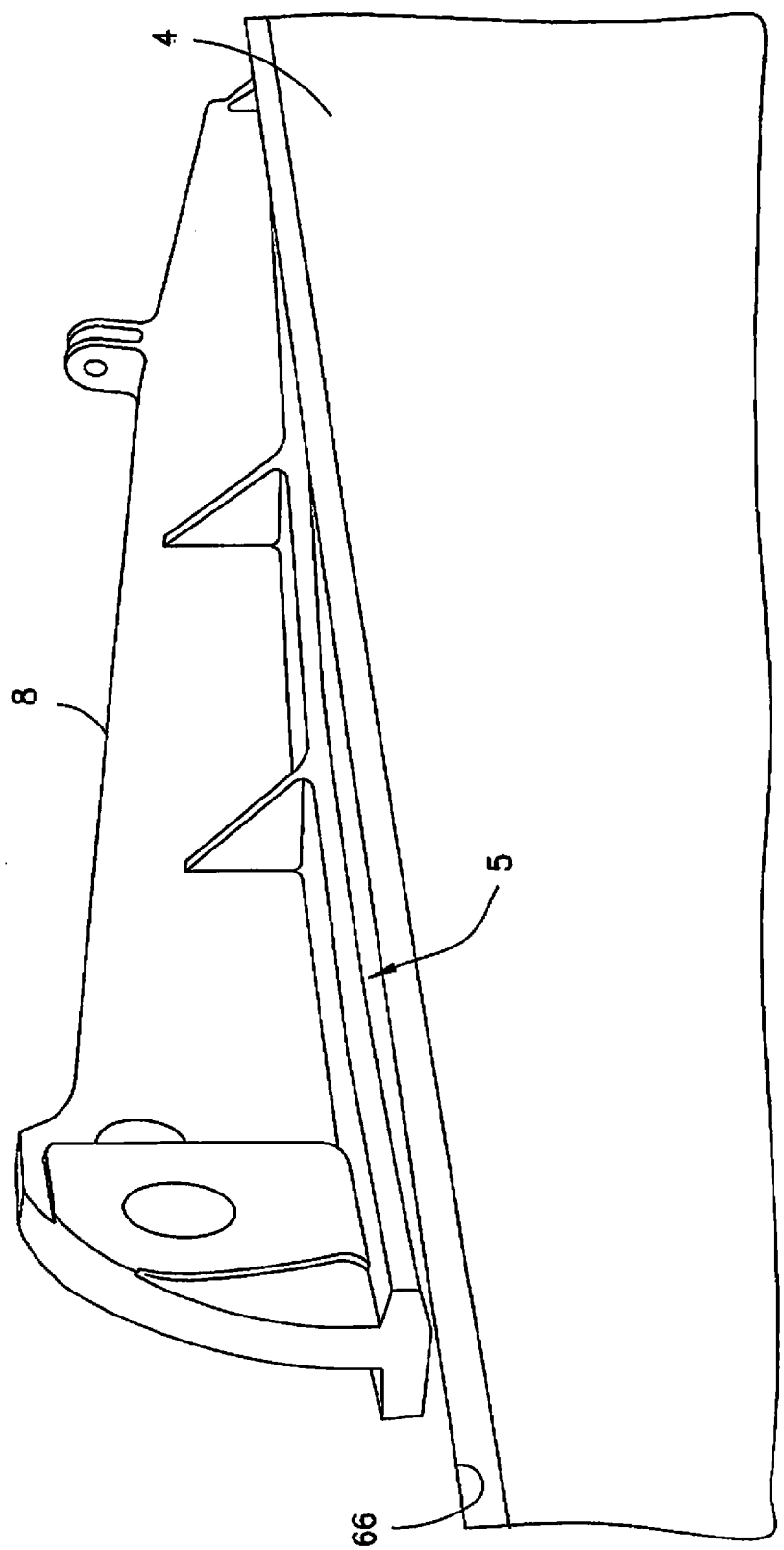
FIG. 25 is a diagram showing a schematic view of a strut fitting and a portion of a wing box with a gap therebetween.

The fitting algorithm for determining the desired relationship between several mating parts is part of a software package called Spatial Analyzer. The Spatial Analyzer software includes fitting routines to minimize the distances between measured points or developed features, i.e., lines developed from measured points in the case of the bores. Numerous correlations or relationships are created for each strut fitting to wingbox instance. For example, in step 242 (see FIG. 17) relationships are established for the following: fitting "A" bore point 1 relative to front spar pitch load fitting measured bore axis; fitting "A" bore point 2 relative to the same front spar pitch load fitting; fitting "A" DA hole measured points relative to wing skin measured DA hole points; fitting "A" measured surface points relative to wing skin measured surface points; and so forth. For each of these relationships, nominal values are defined along with the minimum and maximum acceptable values. Once all is defined, the algorithm will attempt to minimize the deviation from nominal of all of the measure point-to-measure point relationships simultaneously within the defined boundaries (step 244 in FIG. 17). When satisfied, the result is a transformation for moving the virtual fitting to the desired location on the virtual wing surface. The virtual positioning of a virtual strut fitting 8 on a virtual wing skin 66 with a virtual gap 5 therebetween is depicted in FIG. 25

Referring again to FIG. 17, after the virtual strut fitting 8 has been moved to the desired location on the virtual wing skin 66, the wing surface point-to-fitting surface point deviation values are extracted (step 246). These deviation values (representing shim gaps) are assigned to the nominal grid vector locations as described above.

Figure 26:
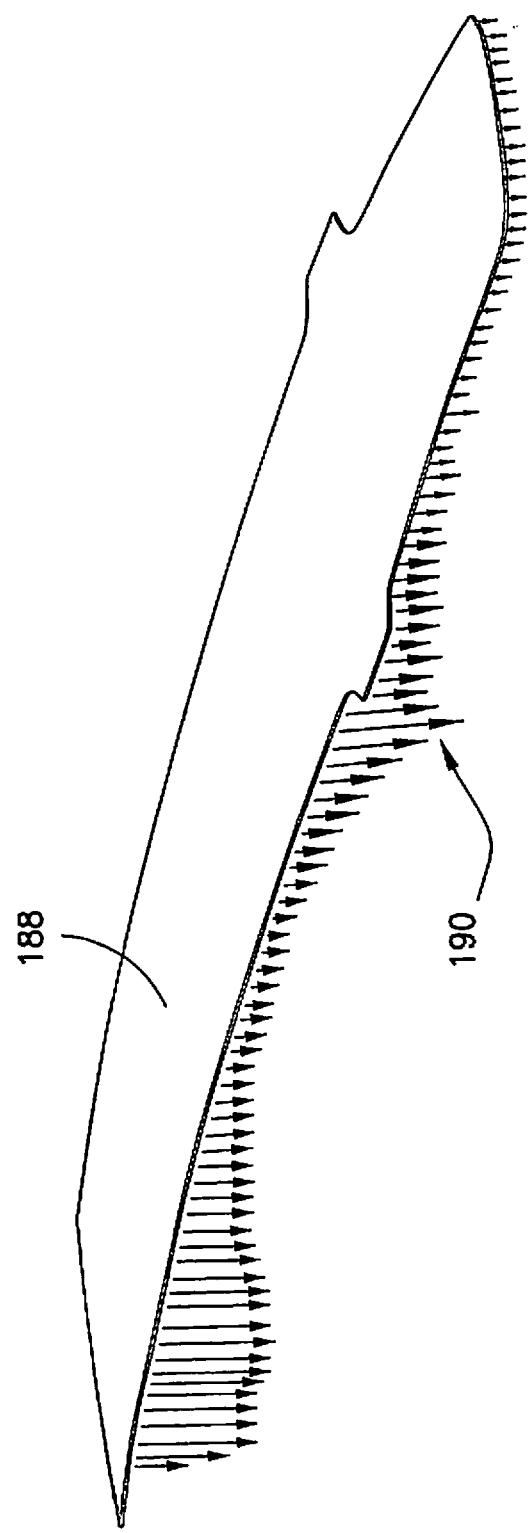
FIG. 26 is a diagram showing an array of uniformly spaced vectors representing a shim shape based on a combination of as-measured surfaces of virtual parts optimally positioned relative to each other.

FIG. 26 is a diagram showing an array of uniformly spaced surface delta vectors 190 extending from a nominal interface surface 188. Each surface delta vector 190 is based on a combination of the as-measured surfaces of the virtual fitting and wing skin optimally positioned relative to each other. More specifically, each surface delta vector 190 represents the vector sum of a respective fitting surface deviation vector and a respective wing surface deviation vector at a respective uniform grid point location. The surface delta vectors 190 define a shim shape.

In accordance with one implementation, it is assumed that one side of the shim will be flat and all of the surface-to-surface gap deviations are applied with respect to that side. This simplifies the machining of the shims. So after the surfaces are aligned correctly relative to one another, the gap values between these surfaces are recorded and then those values are applied to the nominal interface surface 188. Based on these values, a shim having a smooth side and a machined side can be fabricated. The shape of the machined side is a function of the fitting surface-to-wing surface gap values. For the purpose of this methodology, it is assumed that the smooth side of the shim will conform to the actual part surface that it interfaces with.

Referring back to FIG. 17, the shim shape information is then exported to a shim cell server as an .xml type file (step 248). The shim cell server controls the fabrication of the shims based on the shim information provided. The shim gaps are determined after the fittings have been transformed per the fitting algorithm outputs. Thus, when the fittings are later installed by pinning the DA holes and inserting shims having the calculated shapes and dimensions, the relationship of each strut fitting 8 to the wingbox 2 will satisfy all of the Engineering requirements.

The methodology outlined in FIGS. 15 and 17 uses an algorithm to determine the desired relationship between several mating parts. The engineering requirements such as minimum and maximum shim thickness for the shim interface are considered in these calculations. Thus the resultant shim definition is used in conjunction with the DA holes to accurately position each fitting relative to the wingbox. The position of the outer skin part is controlled by virtually constraining the fitting relative to the skin with respect to six degrees of freedom. The 3-D scanner provides dense point cloud data to accurately define the surfaces being measured. The process enables extrapolation of discrete point locations from these point clouds for use in subsequent calculations.

Between the DA hole locations and the shim that is calculated, the methodology disclosed hereinabove solves for all six degrees of freedom to fully virtually constrain one component relative to another. The six degrees of freedom are translation in X, Y, and Z, along with rotation about X, Y, and Z (see $R_X$, $R_Y$ and $R_Z$ in FIG. 11). In order to fully constrain a part, all six degrees of freedom need to be constrained. In the methodology disclosed herein, the DA hole locations constrain in X and Y translation and rotation about the Z axis; and the shims constrain the part in Z translation and rotation about the X and Y axes. Thus the shim gap definition controls the relationship between the fitting bores and the pitch load fitting bores.

In the past it has been a common practice to use a tool that sets the respective locations of two mating parts and then measure the shim gaps at multiple locations. In contrast, the methodology disclosed hereinabove uses a shim definition along with the measured locations of the DA holes to determine the positional relationship of the strut fittings relative to the wing box.

Figure 27:
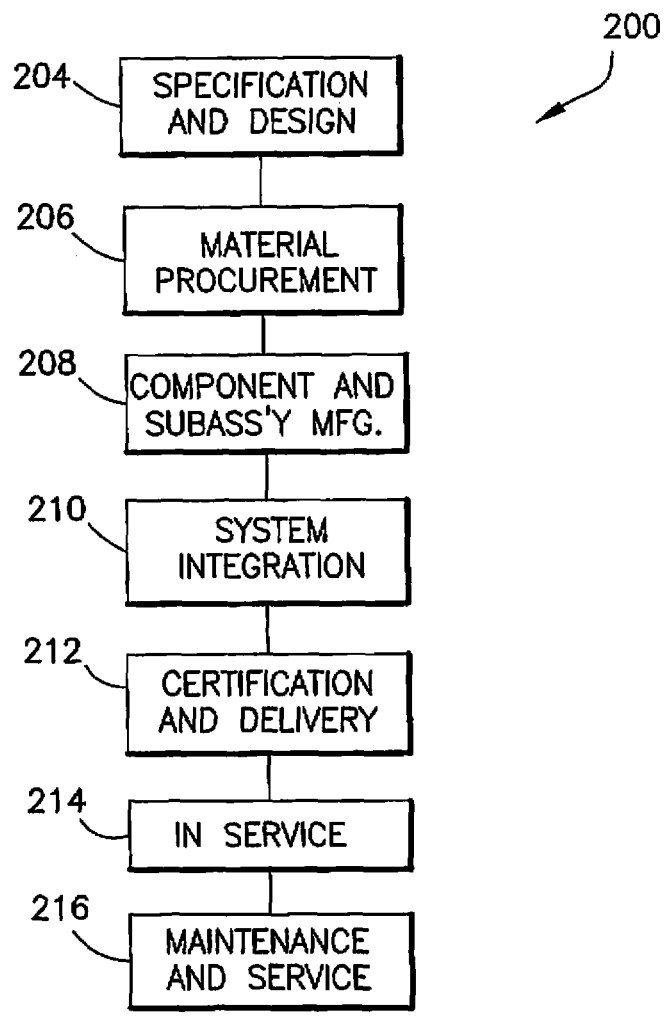
FIG. 27 is a flow diagram of an aircraft production and service methodology.
Figure 28:
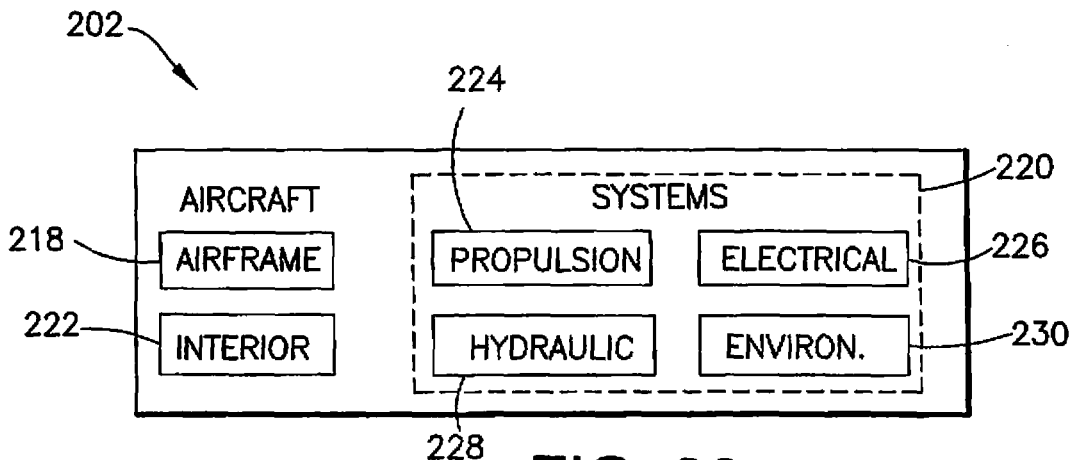
FIG. 28 is a block diagram showing systems of an aircraft.

The methodology disclosed above may be employed in an aircraft manufacturing and service method 200 as shown in FIG. 27 for assembling an aircraft 202 as shown in FIG. 28. During pre-production, exemplary method 200 may include specification and design 204 of the aircraft 202 and material procurement 206. During production, component and subassembly manufacturing 208 and system integration 210 of the aircraft 202 takes place. System integration 210 includes, but is not limited to, the DA hole placement operations disclosed herein. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 28, the aircraft 202 produced by exemplary method 200 may include an airframe 218 (including a fuselage and wing boxes) with a plurality of systems 220 and an interior 222. Examples of high-level systems 220 include one or more of the following: a propulsion system 224, an electrical system 226, a hydraulic system 228, and an environmental control system 230. Any number of other systems may be included. Holes may be drilled in wing boxes or other components using the methods disclosed herein. One or more apparatus embodiments, method embodiments or a combination thereof may be utilized during the system integration stage 210 for substantially expediting assembly of or reducing the cost of an aircraft 202.

While DA hole placement and shim shaping methodologies have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used herein, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. A method for determining characteristics of a shim fittable between first and second bodies, comprising:
   (a) placing optical targets in holes in a first body;
   (b) scanning a surface of the first body using a three-dimensional scanner to acquire at least point cloud scan data and measured hole vector data for the first body;
   (c) processing data comprising at least the point cloud scan data and measured hole vector data for the first body to derive first deviation values representing deviation of the surface of the first body from a nominal surface of the first body for a first grid of points;
   (d) correlating the first deviation values with values representing the surface of a second body for a second grid of points, said correlating being based on a best fit position of the first body relative to the second body; and
   (e) computing shim gap values based on the correlated values.

2. The method as recited in claim 1, wherein said values representing the surface of the second body comprise second deviation values representing deviation of the surface of a second body from a nominal surface of the second body for said second grid of points, the method further comprising:
   placing optical targets in holes in the second body;

scanning a surface of the second body using a three-dimensional scanner to acquire point cloud scan data and measured hole vector data for the second body; and processing data comprising at least the point cloud scan data and measured hole vector data for the second body to derive said second deviation values.

3. The method as recited in claim 1, further comprising: using said shim gap values to develop a shim model; and making a shim in accordance with said shim model.

4. The method as recited in claim 1, wherein process (c) comprises:
deriving hole/surface intersect points for the first body using point cloud scan data surrounding hole locations indicated by said measured hole vector data for the first body;
fitting the scanned surface of the first body to a nominal surface of the first body using said derived hole/surface intersect points for the first body;
extrapolating the point cloud scan data for the first body to points of said first grid of points; and
computing said first deviation values.

5. The method as recited in claim 4, wherein said deriving hole/surface intersect points for the first body comprises averaging point cloud points within a specified radius of a hole location.

6. The method as recited in claim 4, wherein said extrapolating the point cloud scan data for the first body comprises averaging point cloud points within a specified radius of a point of said first grid of points.

7. The method as recited in claim 1, wherein process (g) comprises:
establishing relationships between first body data and second body data; and
optimizing a virtual fit between the first and second bodies.

8. The method as recited in claim 1, wherein said first grid of points are uniformly spaced.

9. The method as recited in claim 4, wherein process (c) further comprises trimming the point cloud scan data for the first body to eliminate extraneous data using a normal boundary prior to extrapolating the point cloud scan data for the first body.

10. The method as recited in claim 1, wherein the first body is a wing box and the second body is a strut fitting.

11. A system for determining characteristics of a shim fittable between first and second bodies, comprising a computer system programmed to execute the following operations:
(a) processing data comprising at least point cloud scan data and measured hole vector data for a first body to derive deviation values representing deviation of the surface of the first body from a nominal surface of the first body for a first grid of points;
(b) correlating the deviation values with values representing the surface of a second body for a second grid of points, said correlating being based on a best fit position of the first body relative to the second body;
(c) computing shim gap values for said grid of points based on the correlated values; and
(d) using said shim gap values to develop a shim model.

12. The system as recited in claim 11, wherein operation (a) comprises:

deriving hole/surface intersect points for the first body using point cloud scan data surrounding hole locations indicated by said measured hole vector data for the first body;
fitting the scanned surface of the first body to a nominal surface of the first body using said derived hole/surface intersect points for the first body;
extrapolating the point cloud scan data for the first body to points of said first grid of points; and
computing said deviation values.

13. The system as recited in claim 12, wherein said deriving hole/surface intersect points for the first body comprises averaging point cloud points within a specified radius of a hole location.

14. The system as recited in claim 12, wherein said extrapolating the point cloud scan data for the first body comprises averaging point cloud points within a specified radius of a point of said first grid of points.

15. The system as recited in claim 11, wherein operation (b) comprises:
establishing relationships between first body data and second body data; and
optimizing a virtual fit between the first and second bodies.

16. The system as recited in claim 12, wherein operation (a) further comprises trimming the point cloud scan data for the first body to eliminate extraneous data using a normal boundary prior to extrapolating the point cloud scan data for the first body.

17. The system as recited in claim 11, wherein the first body is a wing box and the second body is a strut fitting.

18. A method for determining characteristics of a shim that conforms to surfaces of first and second bodies, comprising:
attaching a drill jig having a plurality of drill bushings to a first body;
locating the drill bushings in accordance with the measurements of wing features;
drilling holes in the first body at the locations of the drill bushings;
removing the drill jig from the first body;
placing optical targets in the drilled holes in the first body;
scanning the surface of the first body using a three-dimensional scanner to acquire point cloud scan data and measured hole vector data for the first body;
placing optical targets in the holes in a second body;
scanning the surface of the second body using a three-dimensional scanner to acquire point cloud scan data and measured hole vector data for the second body;
processing data comprising at least the point cloud scan data and measured hole vector data for the first and second bodies to derive shim gap values; and
using said shim gap values to develop a shim model.

19. The method as recited in claim 18, further comprising: making a shim in accordance with said shim model; and placing the shim between the surfaces of the first and second bodies.

20. The method as recited in claim 18, wherein the first body is a wing box and the second body is a strut fitting.

* * * * *